(12) United States Patent
Stingu et al.

(10) Patent No.: US 12,170,448 B2
(45) Date of Patent: Dec. 17, 2024

(54) WIRELESS POWER TRANSMISSION TO A MOBILE DEVICE

(71) Applicant: Spark Connected LLC, Dallas, TX (US)

(72) Inventors: Petru Emanuel Stingu, Dallas, TX (US); Malek Ramezani, Lynnwood, WA (US); Kenneth Moore, Dallas, TX (US); Ruwanga Dassanayake, Dallas, TX (US)

( * ) Notice: Subject to any disclaimer, the term of this patent is extended or adjusted under 35 U.S.C. 154(b) by 0 days.

(21) Appl. No.: 18/355,645

(22) Filed: Jul. 20, 2023

(65) Prior Publication Data

US 2023/0361602 A1 Nov. 9, 2023

Related U.S. Application Data

(63) Continuation of application No. 17/532,710, filed on Nov. 22, 2021, now Pat. No. 11,855,463.
(Continued)

(51) Int. Cl.
*H02J 50/12* (2016.01)
*G04C 10/00* (2006.01)
(Continued)

(52) U.S. Cl.
CPC .............. *H02J 50/12* (2016.02); *G04C 10/00* (2013.01); *G04G 19/00* (2013.01);
(Continued)

(58) Field of Classification Search
None
See application file for complete search history.

(56) References Cited

U.S. PATENT DOCUMENTS

| 3,376,578 A | 4/1968 | Sawyer |
|---|---|---|
| 3,735,231 A | 5/1973 | Sawyer |

(Continued)

FOREIGN PATENT DOCUMENTS

| CN | 209375739 U | 9/2019 |
|---|---|---|
| JP | 2008301554 A | 12/2008 |

OTHER PUBLICATIONS

Bartsch, A., "The Intelligent Mouthguard: A Valid Tool to Meet Demand for Accurate, Precise Head Impact Data," Consult QD, Neurosciences, Advancing Patient Care, Nov. 10, 2015, 6 pages.

(Continued)

*Primary Examiner* — Kirk W Hermann

(57) ABSTRACT

In an embodiment a charging box includes a bottom surface parallel to a first axis, a driver, a switch matrix and a plurality of transmitting coils, each of the plurality of transmitting coils being wrapped around a second axis that is orthogonal to the first axis, wherein the driver is electrically connected to the switch matrix and the plurality of transmitting coils, wherein the switch matrix is configured to determine a power distribution of the plurality of transmitting coils by transmitting a ping to a mobile device and receiving a feedback from the mobile device, to select, based on a ping and feedback process, a pair of transmitting coils that transmits the most power and connect the determined pair of transmitting coils in series, and wherein the charging box is configured to wirelessly transmit power to the mobile device via the selected transmitting coils.

9 Claims, 17 Drawing Sheets

Related U.S. Application Data

(60) Provisional application No. 63/121,668, filed on Dec. 4, 2020.

(51) Int. Cl.
  *G04G 19/00* (2006.01)
  *G06F 3/0354* (2013.01)
  *G06F 3/038* (2013.01)
  *H02J 50/40* (2016.01)
  *H02J 50/70* (2016.01)
  *H02J 50/90* (2016.01)

(52) U.S. Cl.
  CPC .......... *G06F 3/03545* (2013.01); *G06F 3/038* (2013.01); *H02J 50/402* (2020.01); *H02J 50/70* (2016.02); *H02J 50/90* (2016.02)

(56) References Cited

U.S. PATENT DOCUMENTS

| | | |
|---|---|---|
| 4,860,183 A | 8/1989 | Maeda et al. |
| 5,434,504 A | 7/1995 | Hollis et al. |
| 5,498,948 A | 3/1996 | Bruni et al. |
| 6,175,169 B1 | 1/2001 | Hollis, Jr. et al. |
| 6,184,651 B1 | 2/2001 | Fernandez et al. |
| 6,445,093 B1 | 9/2002 | Binnard |
| 6,803,744 B1 | 10/2004 | Sabo |
| 6,949,845 B2 | 9/2005 | Oisugi et al. |
| 8,049,370 B2 | 11/2011 | Azancot et al. |
| 8,193,769 B2 | 6/2012 | Azancot et al. |
| 8,957,549 B2 | 2/2015 | Kesler et al. |
| 9,590,444 B2 | 3/2017 | Walley et al. |
| 9,800,191 B2 | 10/2017 | Barsilai et al. |
| 9,853,441 B2 | 12/2017 | Teggatz et al. |
| 10,054,622 B2 | 8/2018 | Hernandez et al. |
| 10,079,090 B2 | 9/2018 | Teggatz et al. |
| 10,168,443 B2 | 1/2019 | Mangano et al. |
| 2005/0189910 A1* | 9/2005 | Hui .......... H02J 50/10 320/108 |
| 2006/0061323 A1 | 3/2006 | Cheng et al. |
| 2008/0106520 A1 | 5/2008 | Free et al. |
| 2009/0096413 A1* | 4/2009 | Partovi .......... H02J 7/0013 320/108 |
| 2009/0284218 A1* | 11/2009 | Mohammadian .......... H01Q 7/00 320/107 |
| 2010/0181841 A1 | 7/2010 | Azancot et al. |
| 2010/0219183 A1 | 9/2010 | Azancot et al. |
| 2010/0244579 A1 | 9/2010 | Sogabe et al. |
| 2011/0281535 A1 | 1/2011 | Low et al. |
| 2011/0050164 A1 | 3/2011 | Partovi et al. |
| 2011/0062793 A1 | 3/2011 | Azancot et al. |
| 2011/0074344 A1 | 3/2011 | Park et al. |
| 2011/0121660 A1 | 5/2011 | Azancot et al. |
| 2011/0227527 A1 | 9/2011 | Zhu et al. |
| 2012/0032632 A1 | 2/2012 | Soar |
| 2013/0049484 A1 | 2/2013 | Weissentern et al. |
| 2013/0082651 A1 | 4/2013 | Park et al. |
| 2013/0106723 A1 | 5/2013 | Bakken et al. |
| 2013/0257172 A1 | 10/2013 | Teggatz et al. |
| 2013/0264973 A1 | 10/2013 | Garg et al. |
| 2013/0285601 A1 | 10/2013 | Sookprasong et al. |
| 2013/0300204 A1 | 11/2013 | Partovi |
| 2014/0080409 A1 | 3/2014 | Frankland et al. |
| 2014/0184150 A1 | 7/2014 | Walley |
| 2015/0069259 A1* | 3/2015 | Chatoor .......... H01J 37/1475 250/396 ML |
| 2015/0115877 A1 | 4/2015 | Arai et al. |
| 2015/0249484 A1 | 9/2015 | Mach et al. |
| 2015/0270058 A1* | 9/2015 | Golko .......... H01F 27/36 307/104 |
| 2015/0341087 A1 | 11/2015 | Moore et al. |
| 2016/0134154 A1* | 5/2016 | Baarman .......... H02J 7/0013 320/108 |
| 2016/0297305 A1 | 10/2016 | Ichikawa |
| 2017/0077733 A1* | 3/2017 | Jeong .......... H01F 38/14 |
| 2017/0170688 A1* | 6/2017 | Maniktala .......... H01F 38/14 |
| 2017/0282732 A1 | 10/2017 | Lewis et al. |
| 2017/0290210 A1 | 10/2017 | Maeyama |
| 2018/0329527 A1 | 11/2018 | Park et al. |
| 2019/0109498 A1 | 4/2019 | Stingu et al. |
| 2020/0099245 A1* | 3/2020 | Ruscher .......... G06F 1/1626 |
| 2020/0212728 A1 | 7/2020 | Lin et al. |
| 2020/0259369 A1 | 8/2020 | Stingu et al. |
| 2020/0313471 A1 | 10/2020 | Stingu et al. |
| 2021/0200346 A1 | 7/2021 | Kim et al. |
| 2021/0210982 A1 | 7/2021 | Wallace et al. |
| 2021/0273491 A1* | 9/2021 | Lee .......... H02J 50/402 |
| 2021/0325981 A1 | 10/2021 | Park et al. |
| 2021/0349557 A1 | 11/2021 | Li et al. |
| 2021/0408826 A1* | 12/2021 | Liu .......... G06F 1/266 |
| 2022/0052556 A1* | 2/2022 | Goodchild .......... H02J 50/402 |

OTHER PUBLICATIONS

Consumer Reports, "Wireless Charging Pad Review," https://www.consumerreports.org/cro/news/2013/10/wireless-charging-pad-reviews/index.htm, Dec. 11, 2013, 5 pages.

Digi-Key Electronics, "Inductive Versus Resonant Wireless Charging: A Truce May Be a Designer's Best Choice," Aug. 2, 2016, 8 pages.

Gao, X., "Demodulating Communication Signals of Qi-Compliant Low-Power Wireless Charger Using MC56F8006 DSC," Freescale Semiconductor, Application Note, AN4701, Mar. 2013, 21 pages.

Jansen, J. W., "Overview of Analytical Models for the Design of Linear and Planar Motors," IEEE Transactions on Magnetics, vol. 50, No. 11, Nov. 2014, 8 pages.

Johns, B. et al., "Adapting Qi-Compliant Wireless-Power Solutions to Low-Power Wearable Products," Texas Instruments, Power Management, Analog Applications Journal, 2Q, 2014, 7 pages.

Lynch, B., "Under the Hood of a DC/DC Boost Converter," 2013, 26 pages.

Power Electronics, "Qi-Compatible Wireless Charging A11 Type Tx Coil for 5V Applications," Sep. 27, 2016, 11 pages.

Qi Wireless Power Consortium, "The Qi Wireless Power Transfer System," Power Class 0 Specification, Parts 1 and 2: Interface Definitions, Version 1.2.3, Feb. 2017, 165 pages.

Rice, J., "Examining Wireless Power Transfer," Texas Instruments, 2014/15 Power Supply Design Seminar, 2015, 38 pages.

So, A., "This Smart Mouthguard Can Monitor Concussions," Wired, https://www.wired.com/story/this-smart-mouthguard-can-monitor-concussions/, Mar. 1, 2018, 7 pages.

Texas Instruments, "Industry-Leading Wireless Power Solutions," SLYT485C, 2014, 3 pages.

Texas Instruments, "Introduction to Wireless Power," WPC 1.1 Compliant, Aug. 5, 2016, 49 pages.

Texas Instruments, "LC Sensor Rotation Detection With MSP43TM Extended Scan Interface (ESI)," Application Report, SLAA639, Jul. 2014, 33 pages.

Waters, B. et al., "Optimal Coil Size Ratios for Wireless Power Transfer Applications," IEEE, Jul. 28, 2014, 4 pages.

Zens, "Zens First Worldwide to Introduce Built-In Wireless (Sub-)Surface Charger with Apple and Samsung Fast Charge," https://www.makezens.com/article/zens-first-worldwide-introduce-built-wireless-sub-surface-charger-apple-samsung-fast-charge/, Mar. 23, 2018, 5 pages.

* cited by examiner

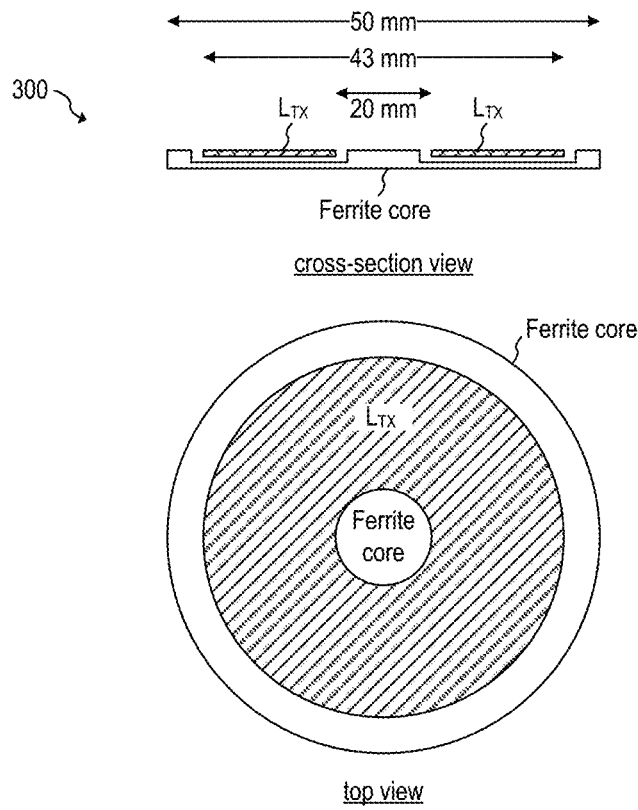
FIG. 3
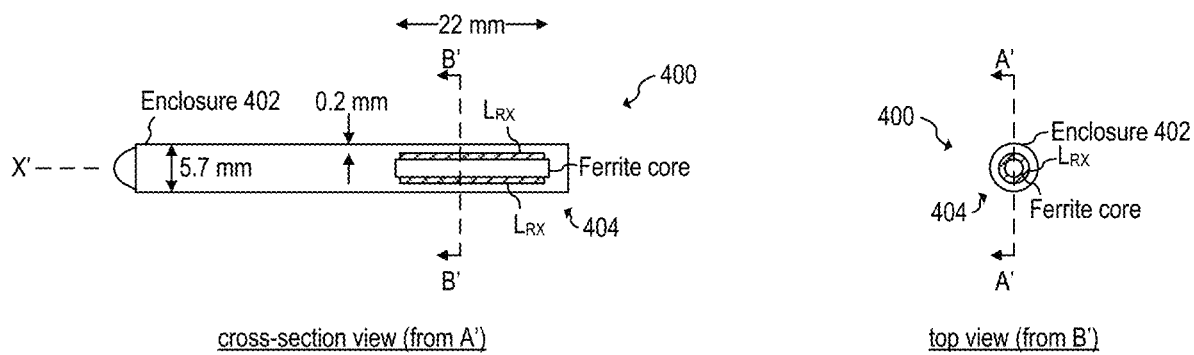
FIG. 4A  FIG. 4B

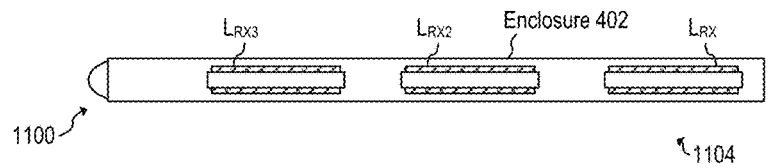
FIG. 11
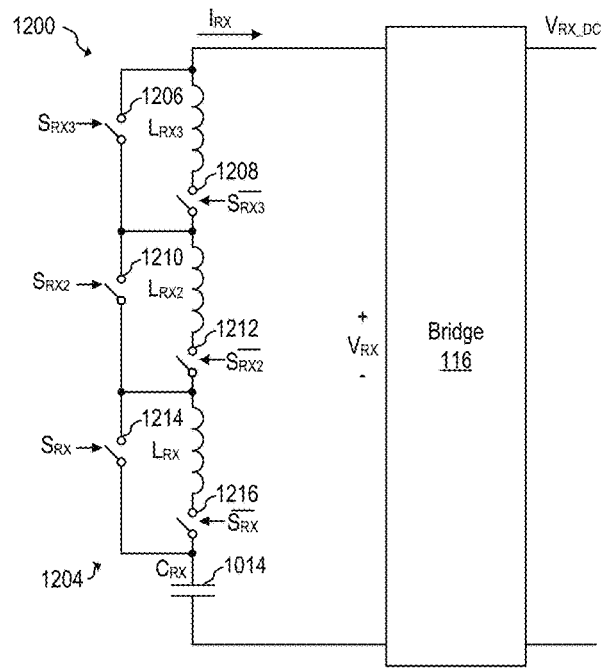
FIG. 12A
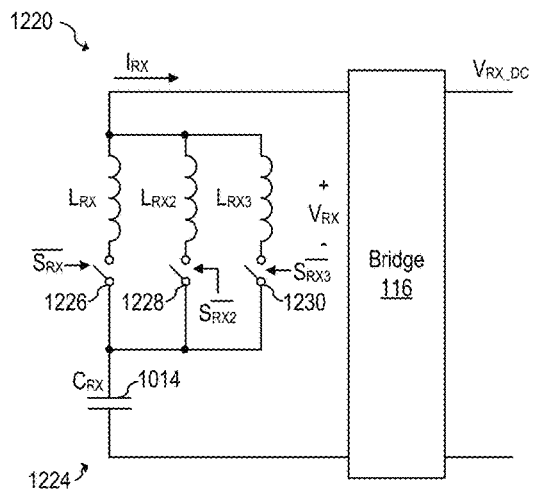
FIG. 12B
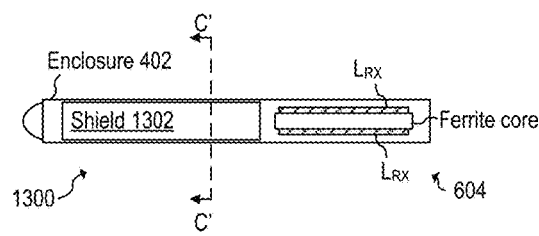
cross-section view (from A')
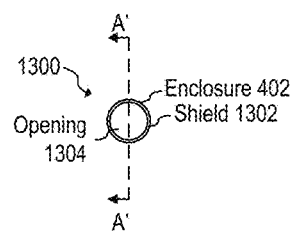
top view (from C')
FIG. 13 top view (from B')

WIRELESS POWER TRANSMISSION TO A MOBILE DEVICE

CROSS-REFERENCE TO RELATED APPLICATIONS

This application is a continuation application of U.S. application Ser. No. 17/532,710 entitled "Wireless Power Transmission to a Mobile Device," and filed Nov. 22, 2021, which claims the benefit of U.S. Provisional Application No. 63/121,668 entitled "Wireless Power Transmission to a Mobile Device," and filed on Dec. 4, 2020, which applications are hereby incorporated herein by reference.

TECHNICAL FIELD

The present disclosure relates generally to an electronic system and method, and, in particular embodiments, to a wireless power transmission to a mobile device.

BACKGROUND

Wireless charging systems are becoming ubiquitous in today's society. For example, many smartphones and wearables implement wireless charging technology. Ease of use, greater reliability, spatial freedom, reduced connectors and openings, and the possibility of hermetically sealing are among the benefits offered by wireless charging. Wireless charging standards allow for interoperability between different devices and manufacturers. Some wireless charging standards, such as the Qi standard (e.g., version 1.2.3) from the Wireless Power Consortium, and standards promoted by the AirFuel alliance, are becoming widely adopted. The Qi standard uses inductive charging operating between 80 kHz and 300 kHz to wirelessly transmit power from a transmitter to a receiver. Standards promoted by the AirFuel alliance use resonant wireless charging operating at 6.78 MHz to wirelessly transmit power from a transmitter to a receiver.

FIG. 1 shows exemplary wireless charging system 100. Wireless charging system 100 includes a transmitter (TX) device/circuit 102 that includes a transmitting coil $L_{TX}$, and a receiver (RX) device/circuit 104 that includes a receiving coil $L_{RX}$. The efficiency of the wireless power transmission generally depends on the coupling between the coil $L_{TX}$ and coil $L_{RX}$. The coupling between the coil $L_{TX}$ and coil is generally based on the relative position between the coil $L_{TX}$ and coil $L_{RX}$.

During normal operation, driver 114 causes a transmitter current $I_{TX}$ to flow through transmitter (TX) LC tank 106. The magnetic field generated by transmitting coil $L_{TX}$ as a result of the flow of current $I_{TX}$ induces current $I_{RX}$ to flow through receiver (RX) LC tank 108. Voltage $V_{RX}$ generated across terminals of RX LC tank 108 is rectified by rectifier bridge 116 to produce rectified voltage $V_{RX\_DC}$. Rectified voltage $V_{RX\_DC}$ can be used to power a load.

SUMMARY

In accordance with an embodiment, an active stylus includes: an enclosure; a first ferrite core disposed inside the enclosure; a wireless power receiver that includes a first receiving coil wrapped around the first ferrite core between the first ferrite core and the enclosure; and an alignment mark configured to be aligned with a center of a transmitting coil of a wireless power transmitter, wherein the alignment mark is not aligned with a center of the first receiving coil.

In accordance with an embodiment, a method for wirelessly transmitting power to a mobile device includes: inducing a transmitter current to flow through first and second transmitting coils of a wireless power transmitter, where the first and second transmitting coils are coupled in series; causing a magnetic flux to flow from the first transmitting coil to the second transmitting coil; and inducing a receiver current to flow in the a receiving coil by directing the magnetic flow through a center of the receiving coil using a ferrite core.

In accordance with an embodiment, a smart watch system includes: a smart watch including a receiving coil, the receiving coil wrapped around a first axis; and a charging box including: a bottom surface parallel to the first axis, and a plurality of transmitting coils, where each of the plurality of transmitting coils are wrapped around a second axis that is orthogonal to the first axis, where the charging box is configured to wirelessly transmit power to the smart watch via the receiving coil by using two transmitting coils of the plurality of transmitting coils.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 shows various views of an exemplary Qi-compatible MP-A11 transmitting coil $L_{TX}$ of an exemplary wireless power transmitter;

FIGS. 4A and 4B show various views of an active stylus, according to an embodiment of the present invention;

FIG. 11 shows an active stylus having three receiving coils, according to an embodiment of the present invention;

FIGS. 12A and 12B show schematic diagrams of portions of wireless power receivers, according to embodiments of the present invention;

FIG. 13 shows various views of an active stylus having a metallic shield, e.g., for protecting electronic components, according to an embodiment of the present invention;

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

It is understood that the term wireless charging is not limited to the charging of a battery, but includes wireless power transmission generally, unless stated otherwise.

Embodiments of the present invention will be described in specific contexts, e.g., wireless power transmission to a mobile device, such as an active stylus, smart glasses, or a smart guard. Embodiments of the present invention may be used with other mobile devices, such as a smart screw driver. Some embodiments may be used with devices different from a mobile device, such as a smart thermostat, a non-mobile smart speaker, or a desktop computer, for example.

In an embodiment of the present invention, an active stylus includes an inductive wireless power receiver for powering one or more circuits of the active stylus and/or for recharging a battery of the stylus. The wireless power receiver includes a receiving coil that is symmetrical to at least one rotation axis of the stylus. In some embodiments, a symmetric receiving coil advantageously allows the wireless power receiver to wireless receive power from a wireless power transmitter without aligning the stylus with respect to the rotating axis.

Figure 1:
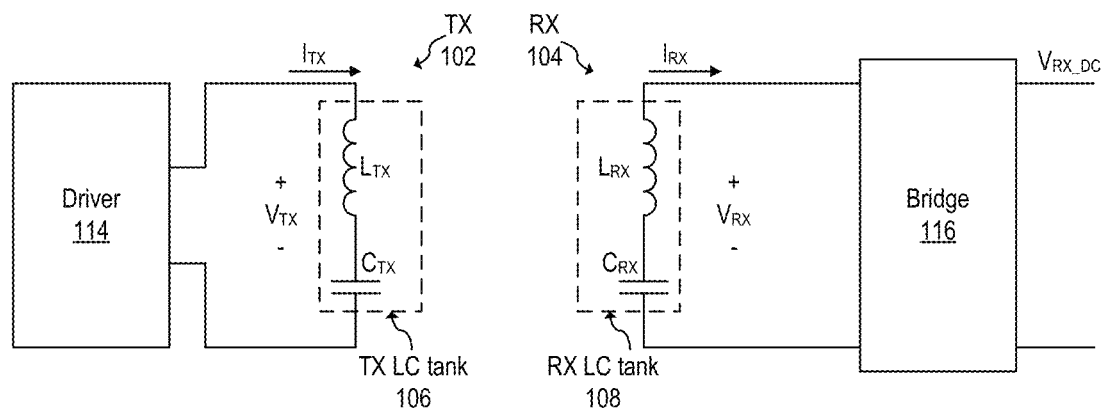
FIG. 1 shows an exemplary wireless charging system.
Figure 2:
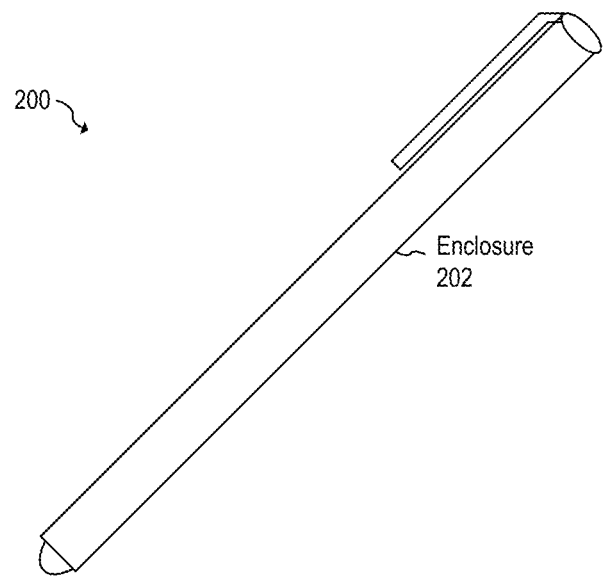
FIG. 2 shows an exemplary stylus for interacting with a capacitive touchscreen.

Wireless power transfer enables the powering of a load (e.g., inside a mobile device) without wires, which advantageously allows for a variety of applications. For example, with the advent of touchscreens, stylus pens (also referred to as stylus, or pens) began to be used, e.g., for interacting with the touchscreen of a tablet or phone. For example, FIG. 2 shows exemplary stylus 200 for interacting with a capacitive touchscreen.

A passive stylus (e.g., of the shape shown in FIG. 2), which does not include any electronic circuits, may be used to interact with a touchscreen, where the touchscreen performs the sensing and processing of the interaction with the stylus in ways known in the art.

An active stylus (e.g., of the shape shown in FIG. 2) includes circuits that, e.g., aid with the interaction with the touchscreen, and may perform additional functions. An active stylus may have the same look as a passive stylus (e.g., as shown in FIG. 2) but includes circuits (e.g., inside enclosure 202). For example, an active stylus may include a gyroscope and/or an accelerometer, e.g., for sensing three-dimensional (3D) movement of the stylus. Such 3D sensing may allow for accurate writing detection, e.g., by detecting the movement of the body of the stylus using inertial sensors in addition to the shape of the pattern drawn in the touchscreen. For example, some active stylus may include pressure sensing and movement tracking capabilities implemented, e.g., by combination data sensed by the stylus with data sensed by touchscreen sensors.

An active stylus may also include circuits for wireless communication (e.g., Bluetooth communication) for transmitting the movement data to the touchscreen device (e.g., tablet or phone).

In some embodiments, an active stylus includes a battery for powering the one or more circuits of the stylus, and a wireless power receiver for charging the battery. By wirelessly charging the battery, some embodiments advantageously allow for a stylus implementation without openings, which may allow for, e.g., a water resistant stylus. Additional advantages of some embodiments include avoiding the need for replacing the battery after a single cycle discharge, which may allow for fully hermetic implementations of the stylus.

In some embodiments, a wireless receiver implemented in the active stylus is a Qi compatible wireless power receiver. In some embodiments, a Qi compatible active stylus advantageously allows, e.g., a device manufacturer to ship a mobile device (e.g., a table or phone) with an active stylus and without a dedicated wireless charger for charging the active stylus, e.g., since a user can use an off-the-shelf Qi compatible wireless power transmitter for charging the active stylus.

FIG. 3 shows various views of an exemplary Qi-compatible MP-A11 transmitting coil $L_{TX}$ of exemplary wireless power transmitter 300. As shown in FIG. 3, the transmitting coil $L_{TX}$ may be implemented with a circular shape (e.g., using Litz wire) and may be coupled to a ferrite core.

FIGS. 4A and 4B show various views of active stylus 400, according to an embodiment of the present invention. Active stylus 400 includes wireless power receiver 404 having a receiving coil $L_{RX}$ that is wrapped around a cylindrical ferrite core (e.g., using Litz wire) inside the enclosure 402 of the active stylus 400. In some embodiments, wireless power receiver 404 is implemented as wireless power receiver 104. In some embodiments, active stylus 400 includes a rechargeable battery (not shown), such as Li-Ion, Li-poly, lithium-iron (e.g., LiFePO$_4$) or silver-zinc, which may be charged with wireless power receive 404.

In some embodiments, the battery, the receiving coil $L_{RX}$ and ferrite core, and the receiver circuit are inside the enclosure 402 of the active stylus 400.

In some embodiments, e.g., as shown in FIGS. 4A and 4B, the enclosure 402 of the stylus, and the ferrite core of the stylus may be cylindrical. In some embodiments, other, shapes may be used, such as rectangular shape, or other shapes using straight or curves edges.

Figure 5:
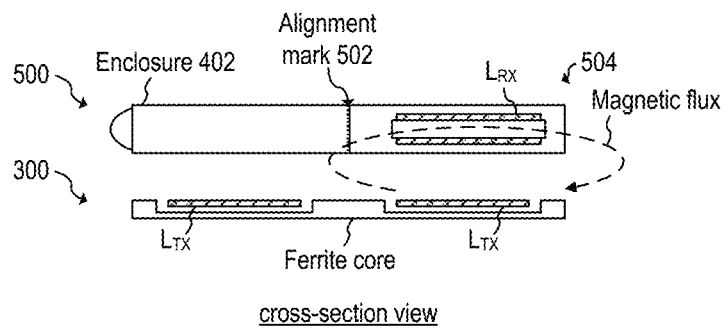
FIG. 5 shows an example of the flow of the magnetic flux for wirelessly transmitting power to an active stylus having one receiving coil, with the Qi-compatible wireless power transmitter of FIG. 3, according to an embodiment of the present invention.

By implementing the receiving coil $L_{RX}$ in a symmetrical manner with respect to the stylus rotating axis (e.g., X' axis in FIG. 4A), some embodiments advantageously allow for wirelessly transferring power to the active stylus 400 without requiring aligning the active stylus 40 with respect to the rotating axis. For example, FIG. 5 shows an example of the flow of the magnetic flux for wirelessly transmitting power to active stylus 500 with a conventional Qi-compatible wireless power transmitter, such as wireless power transmitter 300, according to an embodiment of the present invention. Active stylus 500 includes wireless power receiver 504 having receiving coil $L_{RX}$ that is wrapped around a cylindrical ferrite core (e.g., using Litz wire) inside the enclosure 402. In some embodiments, wireless power receiver circuit 504 is implemented as wireless power receiver circuit 104. In some embodiments, active stylus 500 includes a rechargeable battery (not shown), such as Li-Ion, Li-poly, lithium-iron (e.g., LiFePO$_4$) or silver-zinc, which may be charged with wireless power receive circuit 504. Active stylus 500 operates in a similar manner as active stylus 400. Active stylus 500 is a possible implementation of active stylus 400.

As shown in FIG. 5, placing the receiving coil $L_{RX}$ on top of the windings of the transmitting coil $L_{TX}$ advantageously allows for wirelessly transmitting power to the RX LC tank 108 via the magnetic flux. As shown, the ferrite core of wireless power receiver 504 advantageously directs the magnetic flux generated by the transmitting coil $L_{TX}$ to flow through the receiving coil $L_{RX}$, thereby advantageously inducing receiver current $I_{RX}$.

In some embodiments, aligning the active stylus 500 so that the receiving coil $L_{RX}$ is on top of a winding of the transmitting coil $L_{TX}$ is achieved, e.g., by using a mark 502 in the charging area of the wireless power transmitter (e.g., 300) and/or a mark in the active stylus 500. For example, as shown in FIG. 5, an alignment mark 502 may be placed so that, when aligned with a center of the transmitting coil $L_{TX}$, the center of the receiving coil $L_{RX}$ is on top of windings of the of the transmitting coil $L_{TX}$. As shown in FIG. 5, in some embodiments, the alignment mark 502 is symmetrical to the X' axis. In some such embodiments, the alignment mark 502 may be a continuous line in the enclosure of the active stylus (e.g., as shown in FIG. 5). Other marks, such as an indentation, and other shapes, e.g., a dot, a cross, etc., may also be used.

In some embodiments, rolling or rotating the stylus along the X' axis does not degrade the wireless power transmission, e.g., as long as the receiving coil $L_{RX}$ remains on top of the transmitting coil $L_{TX}$. Implementations of some embodiments in devices different than an active stylus, such as an active screw driver or other active devices that may roll may also derive similar advantages as described with respect to the active stylus.

Figure 6:
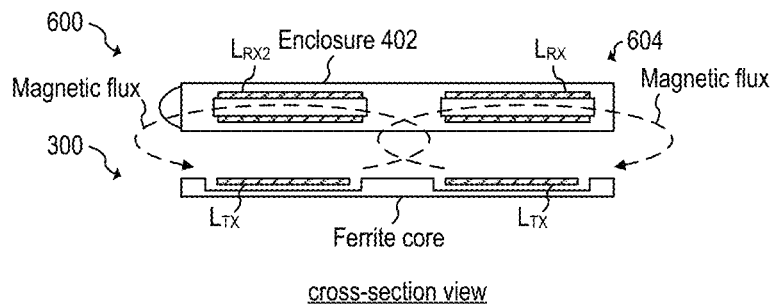
FIG. 6 shows an example of the flow of the magnetic flux for wirelessly transmitting power to an active stylus having two receiving coil, with the Qi-compatible wireless power transmitter of FIG. 3, according to an embodiment of the present invention.

In some embodiments, a second receiving coil $L_{RX2}$ may be placed so that both coils $L_{RX}$ and $L_{RX2}$ wirelessly receiver power transmitter by transmitting coil $L_{TX}$. For example, FIG. 6 shows an example of the flow of the magnetic flux for wirelessly transmitting power to active stylus 600 with a conventional Qi-compatible wireless power transmitter, such as wireless power transmitter 300, according to an embodiment of the present invention. Active stylus 600 includes wireless power receiver 604 having receiving coils $L_{RX}$ and $L_{RX2}$ wrapped around a cylindrical ferrite core (e.g., using Litz wire) inside the enclosure 402. In some embodiments, active stylus 600 includes a rechargeable battery (not shown), such as Li-Ion, Li-poly, lithium-iron (e.g., LiFePO$_4$) or silver-zinc, which may be charged with wireless power receive circuit 604. Active stylus 600 operates in a similar manner as active stylus 400. Active stylus 600, however, includes two receiving coils instead of one receiving coil.

As shown in FIG. 6, in some embodiments, receiving coils $L_{RX}$ and $L_{RX2}$ may be placed inside enclosure 402 so that both coils $L_{RX}$ and $L_{RX2}$ wirelessly receive (e.g., simultaneously) power transmitted by transmitting coil $L_{TX}$.

Figure 7:
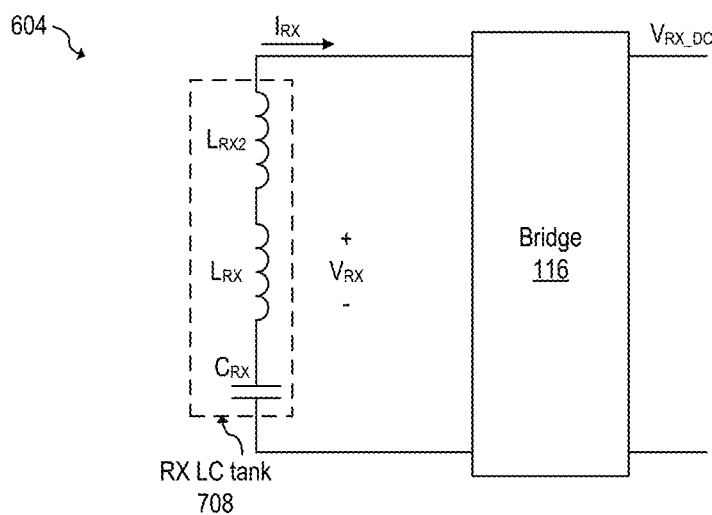
FIG. 7 shows schematic diagram of a portion of the wireless power receiver of FIG. 6, according to an embodiment of the present invention.

FIG. 7 shows schematic diagram of a portion of wireless power receiver 604, according to an embodiment of the present invention. As shown in FIG. 7, receiving coils $L_{RX}$ and $L_{RX2}$ may be connected in series. In some embodiments, rectifier bridge 116 may be implemented in any way known in the art, such as a passive bridge or a as a synchronous rectifier, for example.

In some embodiments, a switch matrix may be used to select which receiving coil (e.g., $L_{RX}$ or $L_{RX2}$) to use depending on how the active stylus is placed in the charging area, e.g., with respect to the transmitting coil $L_{TX}$. For example, in some embodiments, only one of the receiving coils (e.g., $L_{RX}$ or $L_{RX2}$) is selected for wirelessly receiving power, e.g., so that the resonant tank 708 is formed by resonant capacitor $C_{RX}$ and the selected one of the receiving coils (e.g., $L_{RX}$ or $L_{RX2}$). In some embodiments, both coils (e.g., $L_{RX}$ and $L_{RX2}$) are selected, e.g., so that resonant tank 708 is formed by resonant capacitor $C_{RX}$, and receiving coils $L_{RX}$ and $L_{RX2}$.

Figure 8:
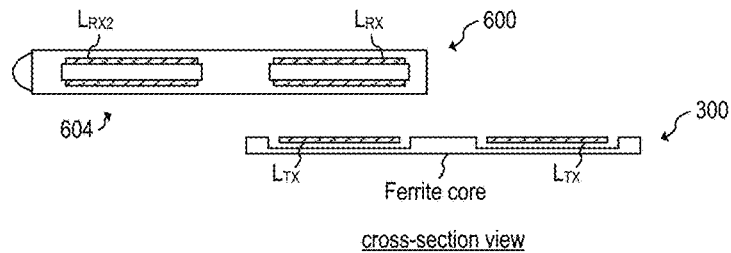
FIGS. 8 and 9 show placements of the active stylus of FIG. 6 with respect to the wireless power transmitter of FIG. 3 in which one of the receiving coils is selected/used while the other receiving coil is not selected/used, according to embodiments of the present invention.
Figure 9:
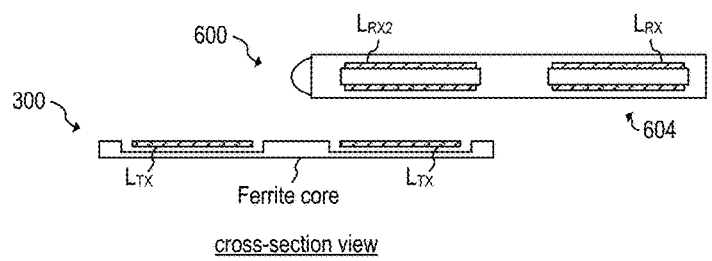

FIG. 8 shows a placement of active stylus 600 with respect to wireless power transmitter 300 in which $L_{RX}$ is selected/used and $L_{RX2}$ is not selected/used, according to an embodiment of the present invention. FIG. 9 shows a placement of active stylus 600 in which $L_{RX2}$ is selected/used and $L_{RX}$ is not selected/used, according to an embodiment of the present invention.

In some embodiments, the selection of the receiving coil (e.g., $L_{RX}$ and/or $L_{RX2}$) of active stylus 600 may be performed during a (e.g., analog or digital) ping process. For example, during the ping process in which the wireless power transmitter (e.g., 300) transmits a ping, active stylus 600 (e.g., via a controller, not shown) may determine which receiving coil (e.g., $L_{RX}$ or $L_{RX2}$) has the strongest field (e.g., based on the voltage across each receiving coil) and may select such receiving coil (e.g., $L_{RX}$ or $L_{RX2}$, e.g., with the highest voltage across it) for receiving wireless power, and send feedback to the wireless power transmitter (e.g., using in-band communication) based on the selected receiving coil. In some embodiments, all coils (e.g., $L_{RX}$ and $L_{RX2}$) receiving a power level above a predefined threshold are selected and connected in series using a switch matrix.

Figure 10A:
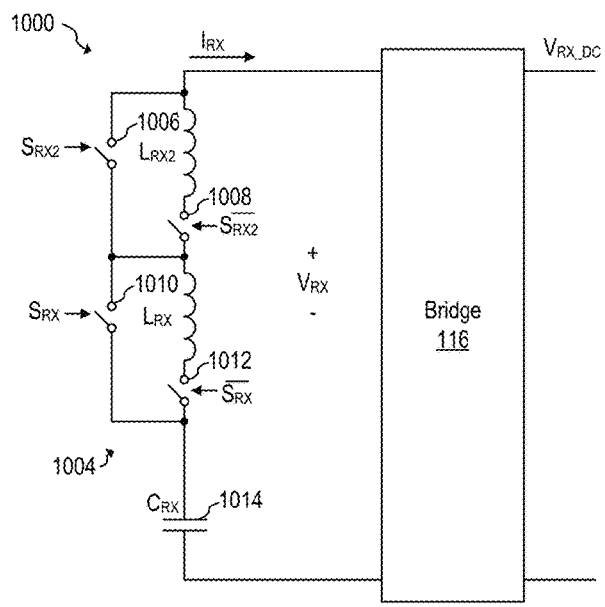
FIGS. 10A and 10B show schematic diagrams of portions of wireless power receivers, according to embodiments of the present invention.

FIG. 10A shows a schematic diagram of a portion of wireless power receiver 1000, according to an embodiment of the present invention. Wireless power receiver 604 may be implemented as wireless power receiver 1000. As shown, switch matrix 1004 is a possible implementation for selecting which receiving coil (e.g., $L_{RX}$ and/or $L_{RX2}$) to use. For example, switch matrix 1004 includes switches 1006, 1008, 1010, and 1012. Thus, selecting receiving coil $L_{RX}$ while disabling receiving coil $L_{RX2}$ (e.g., for the placement shown in FIG. 8) may involve closing switches 1006 and 1012 and opening switches 1008 and 1010.

In some embodiments, selecting coil $L_{RX2}$ while disabling coil $L_{RX}$ (e.g., for the placement shown in FIG. 9) may involve closing switches 1008 and 1010 and opening switches 1006 and 1012. In some embodiments, selecting both coils $L_{RX}$ $L_{RX2}$ (e.g., for the placement shown in FIG. 6) may involve closing switches 1008 and 1012 and opening switches 1006 and 1010.

In some embodiments, switches 1006 and 1008 may be driven by complementary signals $S_{RX2}$ and $\overline{S}_{RX2}$, respectively. In some embodiments, switches 1010 and 1012 may be driver by complementary signals $S_{RX}$ and $\overline{S}_{RX}$, respectively. In some embodiments, switches 1006, 1008, 1010, and 1012 may be implemented in any way known in the art, such as with transistors, for example.

Figure 10B:
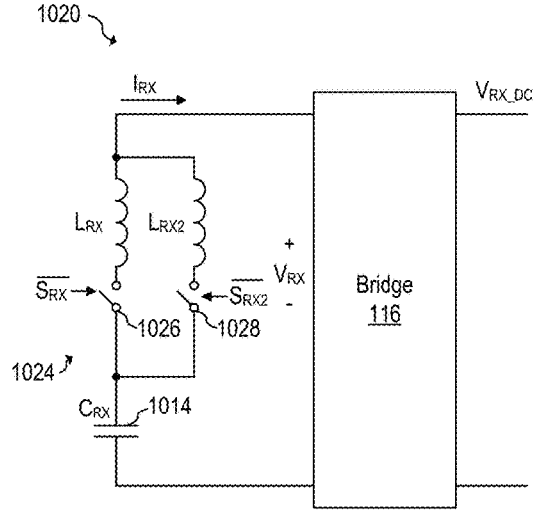

FIG. 10B shows a schematic diagram of a portion of wireless power receiver 1020, according to an embodiment of the present invention. Wireless power receiver 604 may be implemented as wireless power receiver 1020. As shown, switch matrix 1024 is a possible implementation for selecting which receiving coil (e.g., $L_{RX}$ and/or $L_{RX2}$) to use. For example, switch matrix 1024 includes switches 1026 and 1028. Thus, selecting receiving coil $L_{RX}$ while disabling receiving coil $L_{RX2}$ (e.g., for the placement shown in FIG. 8) may involve closing switch 1026 and opening switch 1028. Selecting coil $L_{RX2}$ while disabling coil $L_{RX}$ (e.g., for the placement shown in FIG. 9) may involve closing switches 1026 and opening switch 1028. Selecting both coils $L_{RX}$ $L_{RX2}$ (e.g., for the placement shown in FIG. 6) may involve closing switches 1026 and 1028.

In some embodiments, switches 1026 and 1028 may be driven by signals $\overline{S}_{RX}$ and $\overline{S}_{RX2}$, respectively. In some embodiments, switches 1026 and 1028 may be implemented in any way known in the art, such as with transistors, for example.

In some embodiments, the capacitance $C_{RX}$ of resonant capacitor 1014 may be adjusted (e.g., using a bank of capacitor) depending on the configuration of the switch matrix (e.g., 1004 or 1024) to adjust the resonant frequency of the wireless power receiver (e.g., 1000 or 1020). For example, in some embodiments, the resonant frequency of the wireless power receiver (e.g., 1000 or 1020) may be adjusted to be around 100 kHz, such as between 80 kHz and 130 kHz, for example.

In some embodiments, an active stylus may include more than two receiving coils inside enclosure 402. For example, FIG. 11 shows active stylus 1100 having wireless power receiver 1104 having three receiving coils ($L_{RX}$, $L_{RX2}$ and $L_{RX3}$), according to an embodiment of the present invention. In some embodiments, any combination of the three coils ($L_{RX}$, $L_{RX2}$ and $L_{RX3}$), including all three coils, any two coils, or each individual coil may be selected. In some embodiments, the selectable combinations of coils may be limited to less than all possible combinations. Active stylus 1100 operates in a similar manner as active stylus 600. Active stylus 1100, however, includes three receiving coils instead of two receiving coils.

An active stylus with more than three receiving coils may also be implemented. Active stylus 400 may be implemented as active stylus 1100.

FIGS. 12A and 12B show schematic diagrams of portions of wireless power receivers 1200 and 1220, according to embodiments of the present invention. In some embodiments, wireless power receiver 1104 may be implemented as wireless power receivers 1200 or 1220. As shown, switch matrices 1204 and 1224 are possible implementation for selecting which receiving coil (e.g., $L_{RX}$, $L_{RX2}$ and/or $L_{RX3}$) to use. Wireless power receivers 1200 and 1204 operate in a similar manner as wireless power receivers 1000 and 1020, respectively. Wireless power receivers 1200 and 1220, however, are adapted to operate with three receiving coils instead of two receiving coils. For example, with respect to FIG. 12A, switches 1206, 1208, 1210, 1212, 1214, and 1216 may be open/closed to select one or more of receiving coils $L_{RX}$, $L_{RX2}$ and $L_{RX3}$ for receiving wireless power from a wireless power transmitter (e.g., 300), e.g., in a similar manner as described with respect to FIG. 10A. With respect to FIG. 12B, switches 1226, 1228 and 1230 may be open/closed to select one or more of receiving coils $L_{RX}$, $L_{RX2}$ and $L_{RX3}$ for receiving wireless power from a wireless power transmitter (e.g., 300), e.g., in a similar manner as described with respect to FIG. 10B.

In some embodiments, a ferrite or metallic shield may be used on a portion of the stylus to surround and protect electronic components. In some embodiments, the metallic shield is implemented as a thin layer (e.g., such as a layer of metallic tape) to advantageously prevent or reduce heating of the shield as a result of exposure to the magnetic flux. In some embodiments, thick and highly conductive metal (e.g., 0.8 mm thick aluminum) may be used for shielding (e.g., as another option), e.g., to reduce magnetic induced losses is to use. In some embodiments, the metallic shielding can have a small cutouts or slots, which may advantageously reduce eddy currents.

FIG. 13 shows various views of active stylus 1300, according to an embodiment of the present invention. Active stylus 1300 operates in a similar manner as active stylus 400. Active stylus 1300, however, includes metallic shield 1302, e.g., for protecting electronic components. As shown in FIG. 13, metallic shield 1302 surrounds opening 1304.

In some embodiments, the electronic components of active stylus 1300 may be placed in opening 1304 inside the ferrite or metallic shield 1302. In some embodiments, the metallic shield 1302 is implemented with a metallic tape. In some embodiments, the metallic shield 1302 includes a ferrite material, aluminum, and/or copper.

In some embodiments, the ferrite or metallic shield 1302 may be adapted for active stylus with more than one receiving coils, such as two (e.g., for active stylus 600), three (e.g., for active stylus 1100) or more.

In some embodiments, the ferrite core of the wireless power receiver (e.g., 404, 604, 1104, 1304) may be hollow, and electronic components or a rechargeable battery may be placed within an opening surrounded by the ferrite core. For example, FIG. 14 shows a top view of active stylus 1400, e.g., from the B' perspective, according to an embodiment of the present invention.

Figure 14:
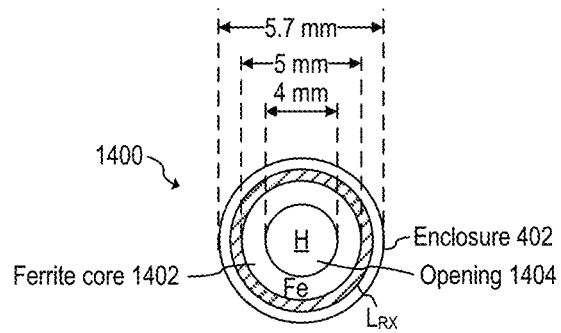
FIG. 14 shows a top view of an active stylus with a hollow ferrite core, according to an embodiment of the present invention.

As shown in FIG. 14, a hollow ferrite core (1402) is used and the receiving coil $L_{RX}$ is wrapped around the hollow ferrite core 1402. As shown, the opening 1404 may be suitable for placement of, e.g., a rechargeable battery and/or of electronic components. In some embodiments, the hollow ferrite core 1402 has the additional advantage of serving as a shield for protecting electronic components disposed inside the hollow ferrite core.

In some embodiments, placing a (e.g., rechargeable) battery inside the hollow ferrite core 1402 advantageously allows for a smaller implementation of the active stylus. In some embodiments, the hollow ferrite core 1402 with a battery inside may be advantageously placed at a location of the stylus to optimize the center of gravity of the stylus, e.g., for user comfort, e.g., by taking advantage of the localized weight of the ferrite core and battery.

In some embodiments, an active stylus such as 400, 600, 1100, and/or 1300 may implement hollow ferrite core 1402, e.g., for including a rechargeable battery and/or electronic components.

Figure 15:
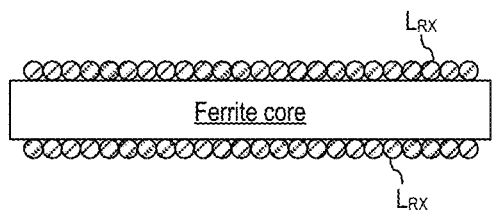
FIG. 15 shows a receiving coil $L_{RX}$ having a single level winding, according to an embodiment of the present invention.

In some embodiments, the receiving coil (e.g., any of $L_{RX}$, $L_{RX2}$, or $L_{RX3}$ of active stylus 400, 600, 1100, 1300, or 1400) may have a single winding level. For example, FIG. 15 shows receiving coil $L_{RX}$ having a single level winding, according to an embodiment of the present invention. As shown in FIG. 15, a single layer of windings of the receiving coil $L_{RX}$ surround the ferrite core of the wireless power receiver.

Figure 16:
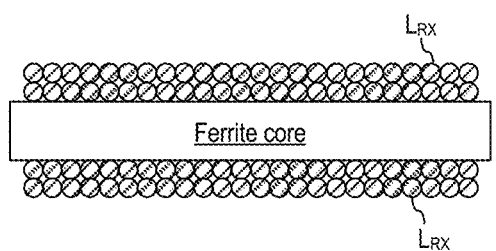
FIG. 16 shows a receiving coil $L_{RX}$ having a two level winding, according to an embodiment of the present invention.

In some embodiments, the receiving coil (e.g., any of $L_{RX}$, $L_{RX2}$, or $L_{RX3}$ of active stylus 400, 600, 1100, 1300, or 1400) may have more than one winding level, such as two, three, or more. For example, FIG. 16 shows receiving coil $L_{RX}$ having a two level winding, according to an embodiment of the present invention. As shown in FIG. 16, two layers of windings of receiving coil $L_{RX}$ surround the ferrite core of the wireless power receiver.

In some embodiments, an active stylus includes a resonant wireless power receiver for powering one or more circuits of the active stylus and/or for recharging a battery of the active stylus.

Figure 17:
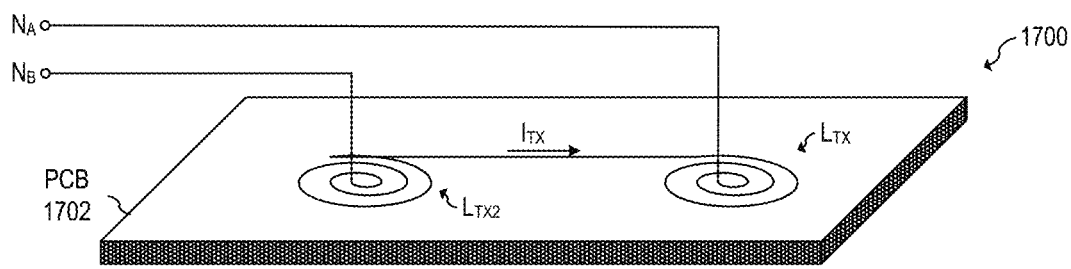
FIG. 17 shows a wireless power transmitter having two transmitting coils, according to an embodiment of the present invention.
Figure 18:
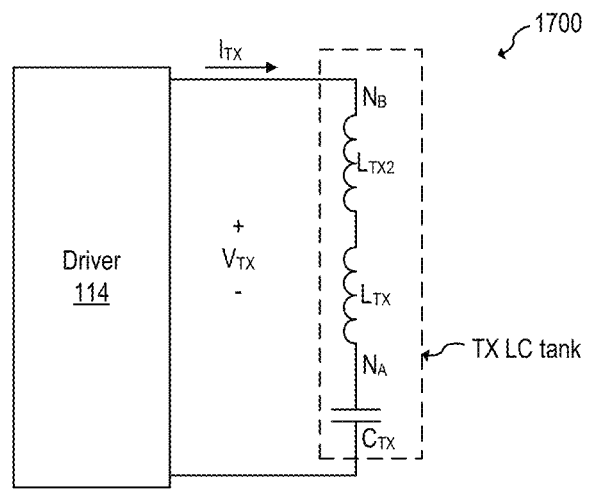
FIG. 18 shows a schematic diagram of the wireless power transmitter of FIG. 17, according to an embodiment of the present invention.

FIG. 17 shows resonant wireless power transmitter 1700 having two transmitting coils according to an embodiment of the present invention. FIG. 18 shows a schematic diagram of wireless power transmitter 1700, according to an embodiment of the present invention. Wireless power transmitter 1700 includes two transmitting coils ($L_{TX}$ and $L_{TX2}$), e.g., implemented as traces in printed circuit board (PCB) 1702 and driver 114. As shown in FIGS. 17 and 18, in some embodiments, transmitting coils $L_{TX}$ and $L_{TX2}$ may be connected in series.

In some embodiments, transmitting coils $L_{TX}$ and $L_{TX2}$ may be implemented as traces in PCB 1702 (e.g., as shown in FIG. 17) or with Litz wire. Other implementations are also possible.

In some embodiments, a ferrite core may be used, e.g., underneath the transmitting coils $L_{TX}$ and $L_{TX2}$.

In some embodiments, resonant wireless power transmitter 1700 operates at 6.78 MHz. In some embodiments, wireless power transmitter 1700 may operate at frequencies different from 6.78 MHz. For example, some embodiments may operate at near field communication (NFC) frequency of 13.56 MHz. As another example, in some embodiments, wireless power transmitter 1700 may operate at 100 kHz to 600 kHz, e.g., as an inductive charger, e.g., according to the Qi standard (e.g., version 1.2.3). Dimensions of the transmitting coils (e.g., $L_{TX}$, $L_{TX2}$) and corresponding receiving coils (e.g., $L_{RX}$, $L_{RX2}$, $L_{RX3}$), e.g., of the active stylus may be adapted for the particular frequency or frequency range used for wirelessly transmitting/receiving power.

Driver 114 is configured to cause current $I_{TX}$ to flow through transmitting coils $L_{TX}$ and $L_{TX2}$. Driver 114 may be implemented in any way known in the art, such as with a full-bridge, for example.

In some embodiments, wireless power transmitter 1700 may be used to provide wireless power to any of active stylus 400, 600, 1100, 1300, and/or 1400.

Figure 19:
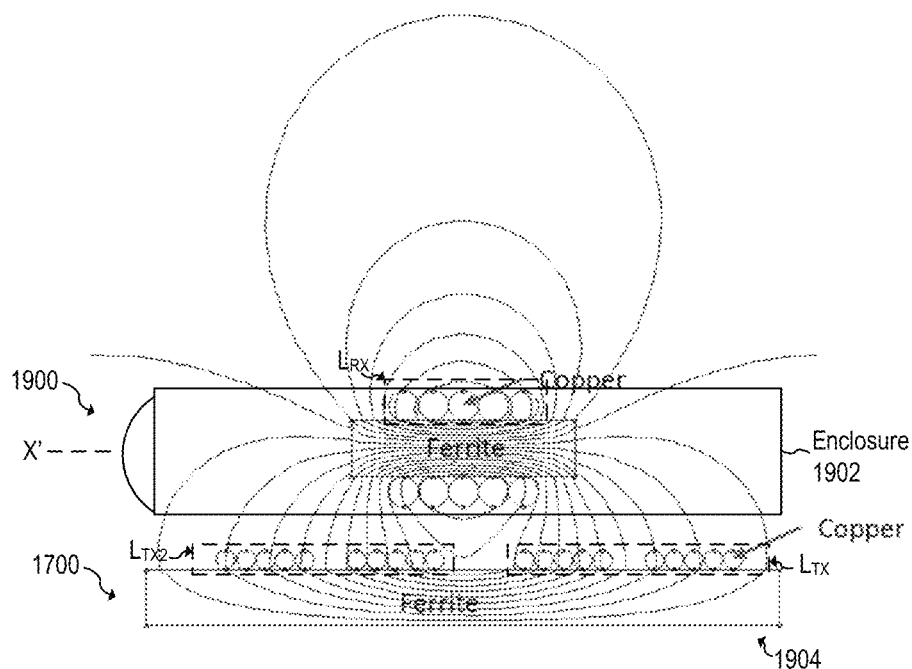
FIG. 19 shows an example of the flow of the magnetic flux for wirelessly transmitting power from the wireless power transmitter of FIG. 17 to an active, according to an embodiment of the present invention.

FIG. 19 shows an example of the flow of the magnetic flux for wirelessly transmitting power from wireless power transmitter 1700 to an active stylus while operating wireless power transmitter 1700 as a resonant wireless power transmitter (at 6.78 MHz), according to an embodiment of the present invention. Enclosure 1902 of active stylus 1900 may be similar or identical to enclosure 402, and may include a receiving coil $L_{RX}$ wrapped around a ferrite core, e.g., in a similar manner as shown in FIG. 4.

As shown in FIG. 19, and similar to the embodiment of FIG. 5, the ferrite core of wireless power receiving 1904 advantageously directs the magnetic flux generated by the transmitter to flow through the receiving coil $L_{RX}$, thereby advantageously inducing receiver current $I_{RX}$. However, in the embodiment of FIG. 19, the magnetic flux originates in one coil (e.g., $L_{TX2}$) and is received in a different coil (e.g., $L_{TX}$). As such, in the embodiment of FIG. 19, the receiving coil $L_{RX}$ is placed between the two transmitting coils ($L_{TX}$ and $L_{TX2}$) for wirelessly receiving power from wireless power transmitter 1700.

In some embodiments, using a topology with a resonant wireless power transmitter, (e.g., 1700, as shown in FIGS. 17-19) advantageously allows for shorter windings in both the transmitting coil (e.g., $L_{TX}$+$L_{TX2}$) and receiving coil ($L_{RX}$) and may be more efficient than implementations with inductive charging (e.g., since the current may circulate through less wire in both the transmitting coil and receiving coil).

As shown in FIG. 19, in some embodiments, the receiving coil $L_{RX}$ is symmetrical with respect to the X' axis, which, in some embodiments, advantageously allows the wireless power receiver (e.g., 1904) of the active stylus (e.g., 1900) to receive wireless power from the wireless power transmitter (e.g., 1700) without aligning the stylus with respect to the rotating axis. For example, in some embodiments, active stylus 1900 may be rotated while receiving power without disrupting wireless power transfer.

In some embodiments, a, e.g., custom, wireless charging box may be used for placing the active stylus (e.g., 1900) for storage and/or wireless power charging. In some embodiments, using a wireless charging box advantageously enforces a particular (e.g., optimal) alignment for wireless power transfer to the active stylus. In some embodiments, the wireless charging box may be passive, and may be placed, e.g., on top of a wireless charging area for charging. In other embodiments, the wireless charging box may include the wireless power transmitter. For example, the transmitting coil (e.g., $L_{TX}$, $L_{TX2}$) may be implemented inside or attached to the enclosure of the wireless charging box.

In some embodiments, features described with respect to FIGS. 4-16 are also included in the embodiments described in FIGS. 17-19, such as using a hollow ferrite core (e.g., 1402), e.g., for including a rechargeable battery and/or electronic components, the use of a shield (e.g., 1302), the use of multiple receiving coils (e.g., combination of one or more of $L_{RX}$, $L_{RX2}$, $L_{RX3}$) together with a switch matrix (e.g., 1004, 1024, 1204, 1224), and/or the use of a wireless charging box.

Figure 20:
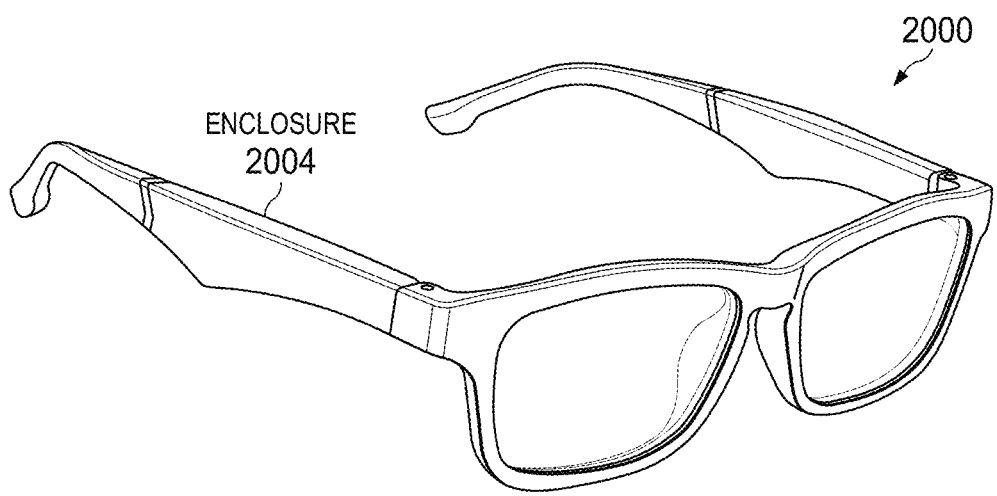
FIG. 20 shows smart glasses, according to an embodiment of the present invention.

The embodiments described with respect to FIGS. 4-19 may be implemented in devices different from an active stylus. For example, FIG. 20 shows smart glasses 2000, according to an embodiment of the present invention. As shown in FIG. 20, implementations of the wireless power receiver of any of the active stylus described and illustrated with respect to FIGS. 4-19 may be implemented inside the enclosure 2004 of a leg of smart glasses 2000.

Smart glasses 2000 may be understood as glasses that include one or more electronic circuits. Examples of circuits that may be included in smart glasses include camera, projector (e.g., for transparent heads-up display), temperature sensor, audio amplifier with speakers, wireless communication devices (e.g., Bluetooth, WiFi), etc. As such, smart glasses 2000 may include one or more of a camera, a projector (e.g., for transparent heads-up display), temperature sensor(s), an audio amplifier with speakers, and/or wireless communication devices (e.g., Bluetooth, WiFi), etc.

Figure 21:
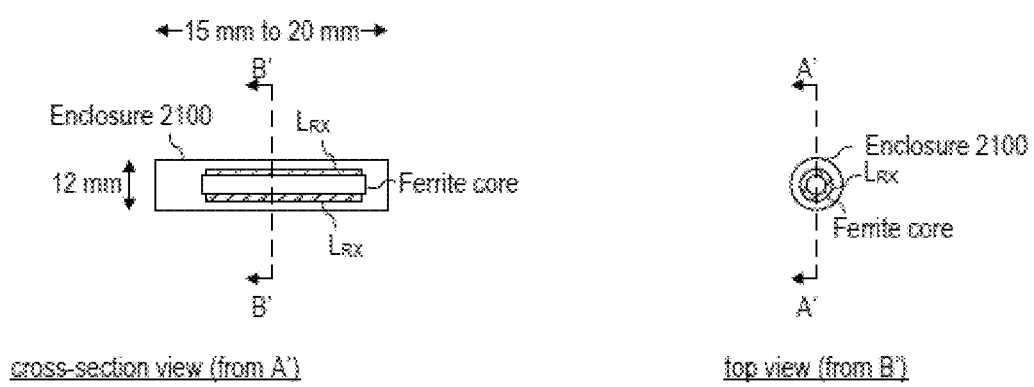
FIGS. 21 and 22 show possible implementations of the enclosure of the smart glasses of FIG. 20, according to embodiments of the present invention.
Figure 22:
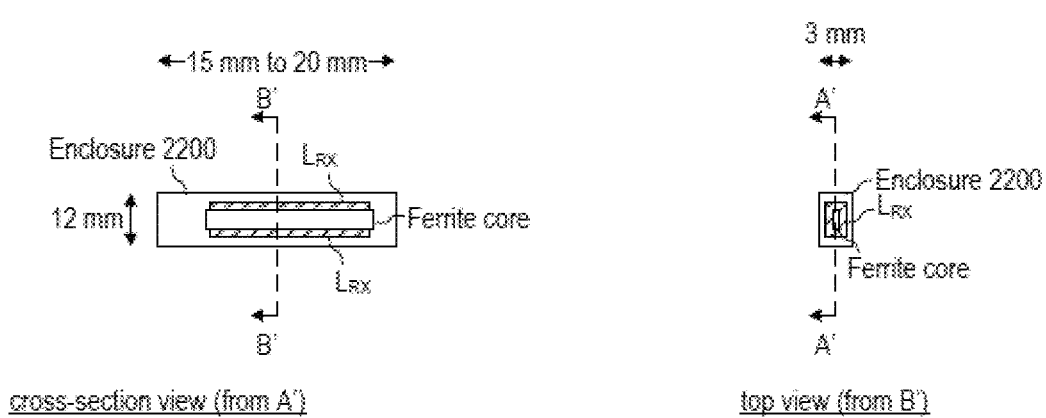

FIGS. 21 and 22 show enclosures 2100 and 2200, respectively, according to an embodiment of the present invention. Enclosure 2004 may be implemented as enclosures 2100 or 2200.

As shown, enclosure 2100 has a cylindrical shape while enclosure 2200 has a rectangular parallelepiped shape. Other implementations, e.g., with other shapes and dimensions, are also possible.

Figure 23:
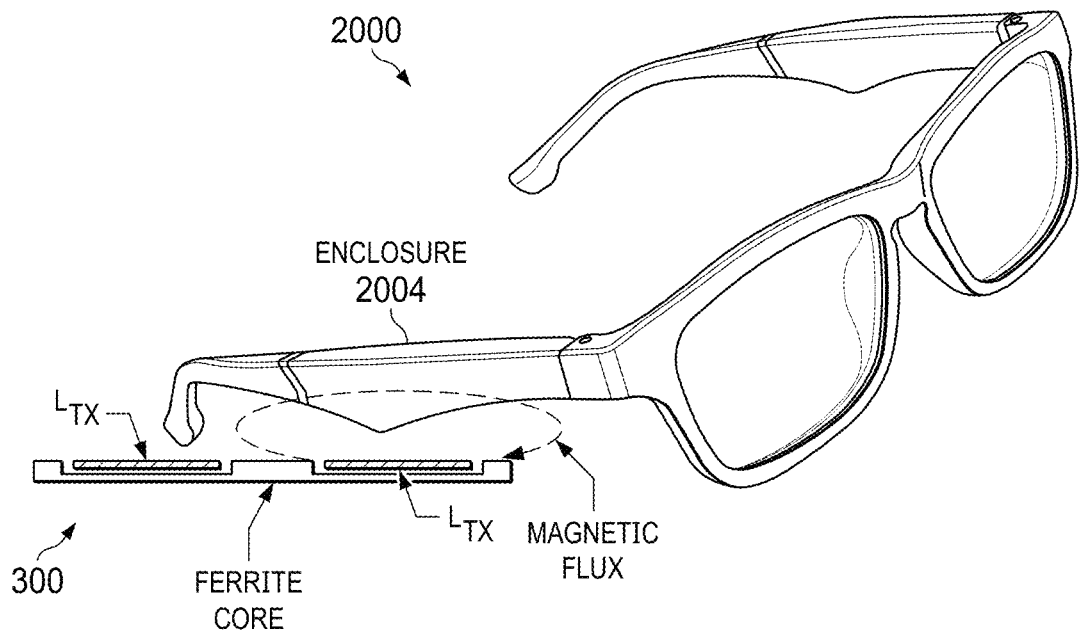
FIG. 23 shows an example of the flow of the magnetic flux for wirelessly transmitting power to the active smart glasses of FIG. 20 with the wireless power transmitter of FIG. 3, according to an embodiment of the present invention.

FIG. 23 shows an example of the flow of the magnetic flux for wirelessly transmitting power to active smart glasses 2000 with a conventional Qi-compatible wireless power transmitter, such wireless power transmitter 300, according to an embodiment of the present invention. In some embodiments, the receiving coil $L_{RX}$ may be implemented inside the enclosure of a leg of the smart glass, e.g., as shown in FIG. 21 or 22. Other implementations, such as using a hollow ferrite core, e.g., for including a rechargeable battery and/or electronic components, the use of a shield, the use of multiple receiving coils together with a switch matrix, and/or the use of a wireless charging box, are also possible.

Figure 24:
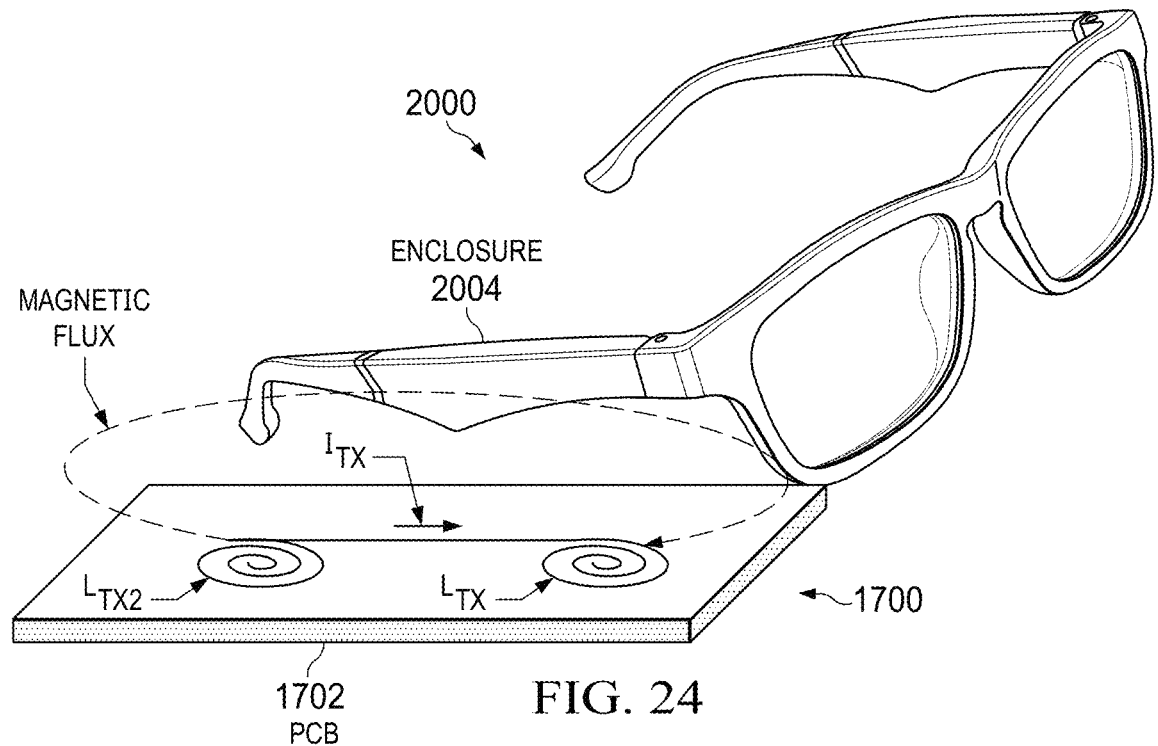
FIG. 24 shows an example of the flow of the magnetic flux for wirelessly transmitting power to the active smart glasses of FIG. 20 with the resonant wireless power transmitter of FIG. 17, according to an embodiment of the present invention.

FIG. 24 shows an example of the flow of the magnetic flux for wirelessly transmitting power to the active smart glasses of FIG. 20 with a resonant wireless power transmitter (e.g., 1700), according to an embodiment of the present invention. In some embodiments, the receiving coil $L_{RX}$ may be implemented inside the enclosure 2004 of a leg of smart glass 2000, e.g., as shown in FIG. 21 or 22. Other implementations, such as using a hollow ferrite core, e.g., for including a rechargeable battery and/or electronic components, the use of a shield, the use of multiple receiving coils together with a switch matrix, and/or the use of a wireless charging box, are also possible.

In an embodiment of the present invention, a device includes a resonant wireless power receiver for powering one or more circuits of the device and/or for recharging a battery of the device. The wireless power receiver includes a receiving coil oriented orthogonally with respect to the transmitting coil of the resonant wireless power transmitter. In some embodiments, multiple transmitting coils are implemented at or attached to the base of a charging box for wirelessly transmitting power to the device. In some embodiments, the device is a wearable device, such as a smart watch. Other devices having a vertical coil for receiving wireless power from transmitting coils that are on a horizontal plane can also be implemented. For example, in some embodiments, smart glasses may be implemented in this manner.

Figure 25:
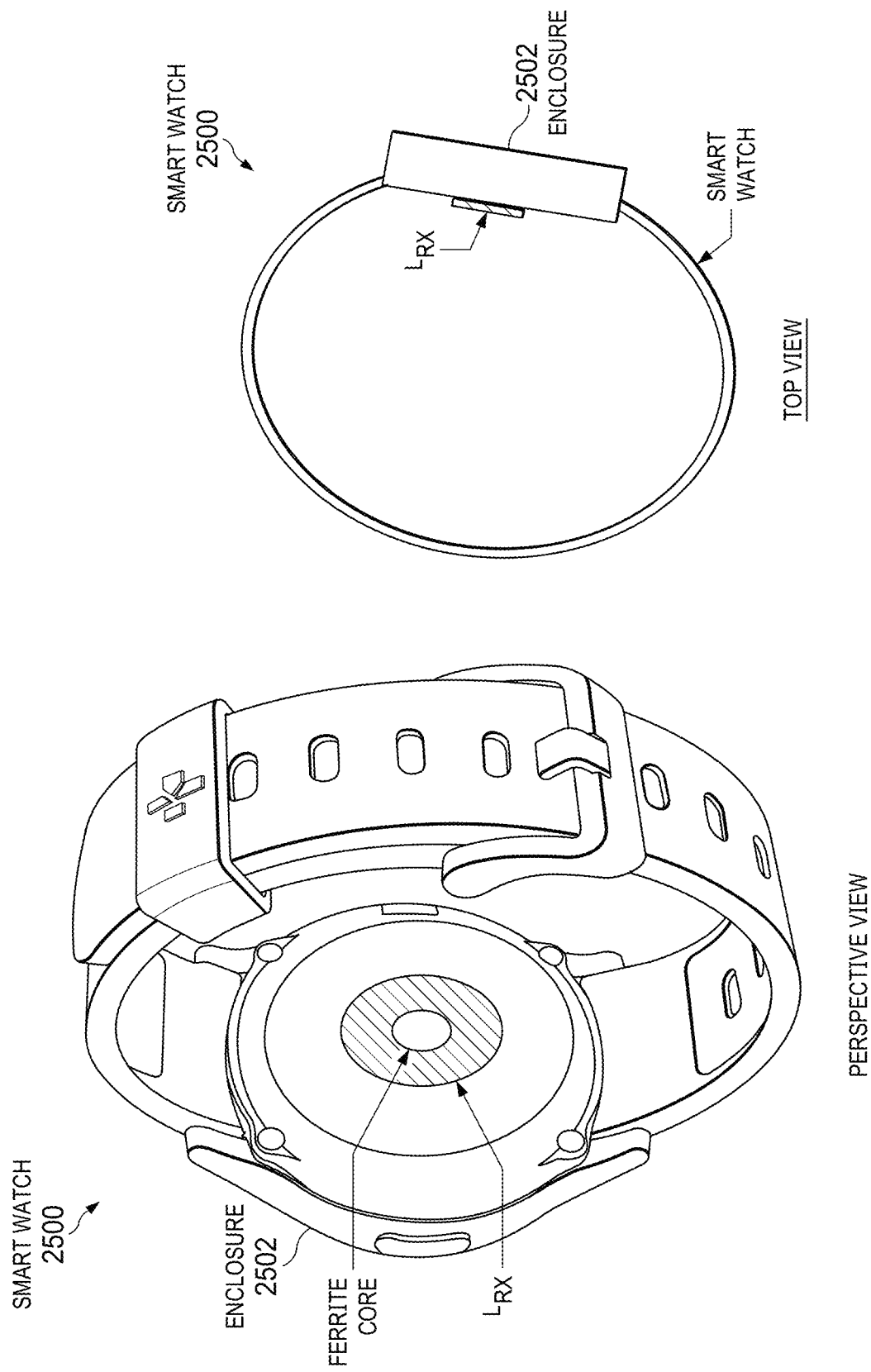
FIG. 25 shows various views of a smart watch, according to an embodiment of the present invention.

FIG. 25 shows various views of smart watch 2500, according to an embodiment of the present invention. As shown in FIG. 25, smart watch 2500 includes a receiving coil $L_{RX}$ that is vertically oriented when the smart watch 2500 is placed on its side (as shown in the top view of FIG. 25).

Figure 26:
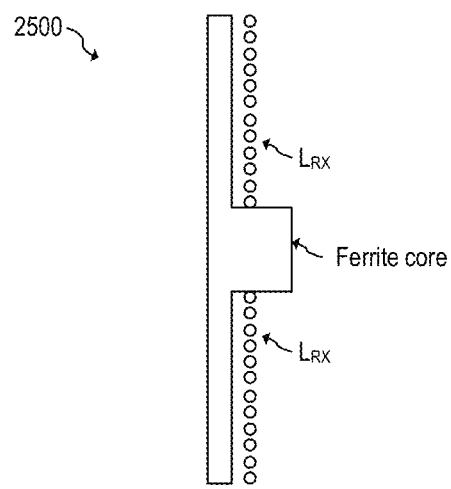
FIG. 26 illustrate the receiving coil $L_{RX}$ and ferrite core of the smartwatch of FIG. 25, according to an embodiment of the present invention.

FIG. 26 illustrates the receiving coil $L_{RX}$ and ferrite core of smart watch 2500, according to an embodiment of the present invention. As shown in FIG. 26, in some embodiments, the receiving coil $L_{RX}$ may be implemented with Litz wire.

Figure 27:
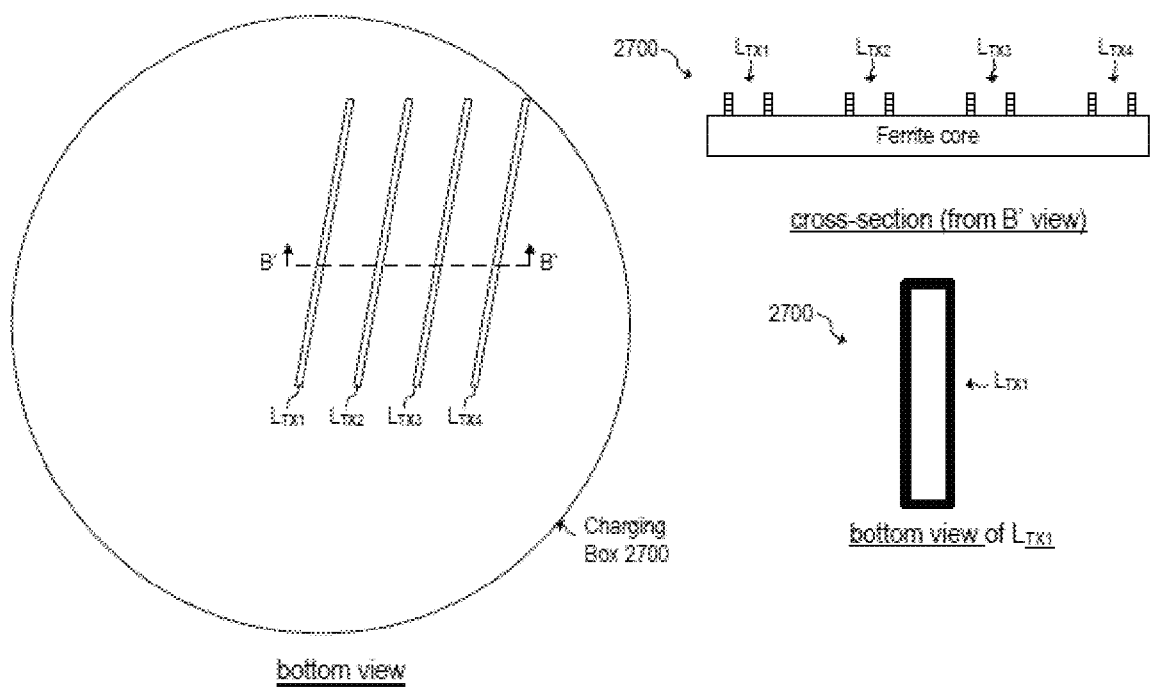
FIG. 27 shows various views of a charging box for wirelessly transmitting power to the smart watch of FIG. 25, according to an embodiment of the present invention.

FIG. 27 shows various views of charging box 2700 for wirelessly transmitting power to smart watch 2500, according to an embodiment of the present invention. As shown in FIG. 27, in some embodiments, 4 transmitting coils ($L_{TX1}$, $L_{TX2}$, $L_{TX3}$, $L_{TX4}$) may be used for transmitting wireless power to the receiving coil $L_{RX}$ of smart watch 2500. Each of the 4 transmitting coils may be implemented with a single turn per layer, and with multiple layers (to achieve multiple turns).

Although FIG. 27 shows the transmitting coils implemented outside the charging box 2700 at a bottom surface of the charging box 2700 (e.g., below the charging box), some embodiments may implement the transmitting coils inside the charging box, arranged with a similar orientation as shown in FIG. 27.

As will be described in more detail below, using two transmitting coils (e.g., $L_{TX2}$ and $L_{TX3}$ may be sufficient in some embodiments. In some embodiments, using more than two transmitting coils advantageously allows for optimizing wireless power transfer despite different placements, thereby allowing for wirelessly transmitting power without carefully aligning the smart watch 2500 with respect to the charging box 2700. For example, FIGS. 28 and 29 show two possible alignments of smart watch 2500 with respect to the charging box 2700, according to an embodiment of the present invention.

Figure 28:
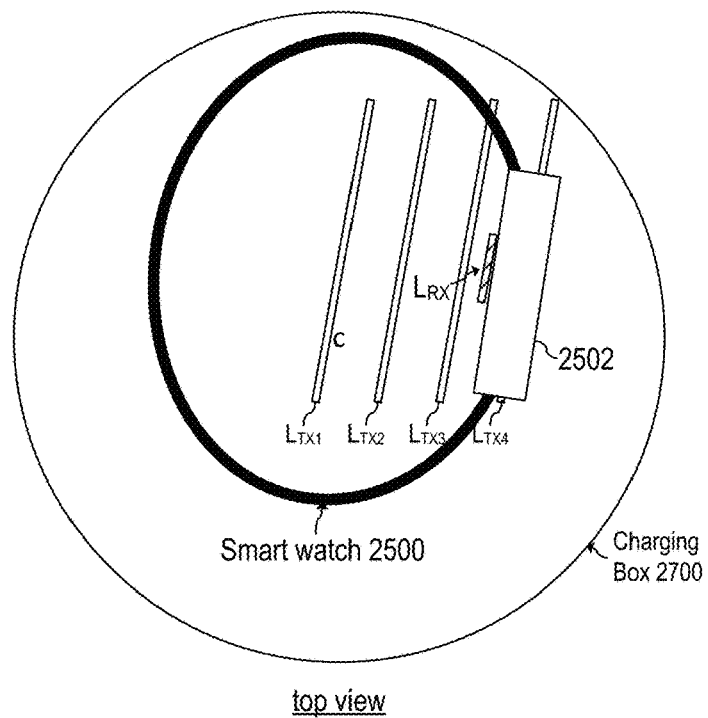
FIGS. 28 and 29 show two possible alignments of the smart watch of FIG. 25 with respect to the charging box of FIG. 27, according to an embodiment of the present invention.
Figure 29:
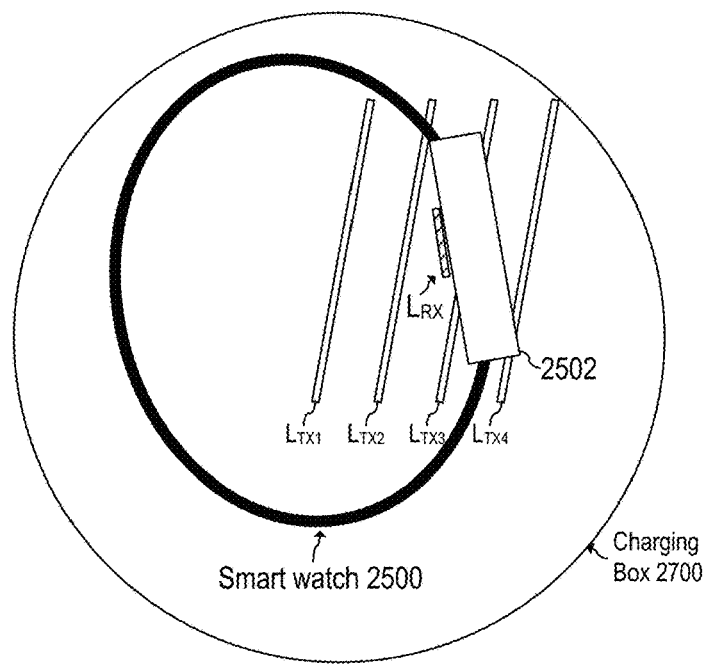

As shown, transmitting coils $L_{TX3}$ and $L_{TX4}$ may be used to wirelessly transmit power to the receiving coil $L_{RX}$ with the placement illustrated in FIG. 28. transmitting coils $L_{TX2}$ and $L_{TX3}$ may be used to wirelessly transmit power to the receiving coil $L_{RX}$ with the placement illustrated in FIG. 29. Thus, in some embodiments, the pair of transmitting coils may be elected from the plurality of transmitting coils in the charging box 2700 to, e.g., optimize, the transfer of wireless power from to smart watch 2500.

Figure 30:
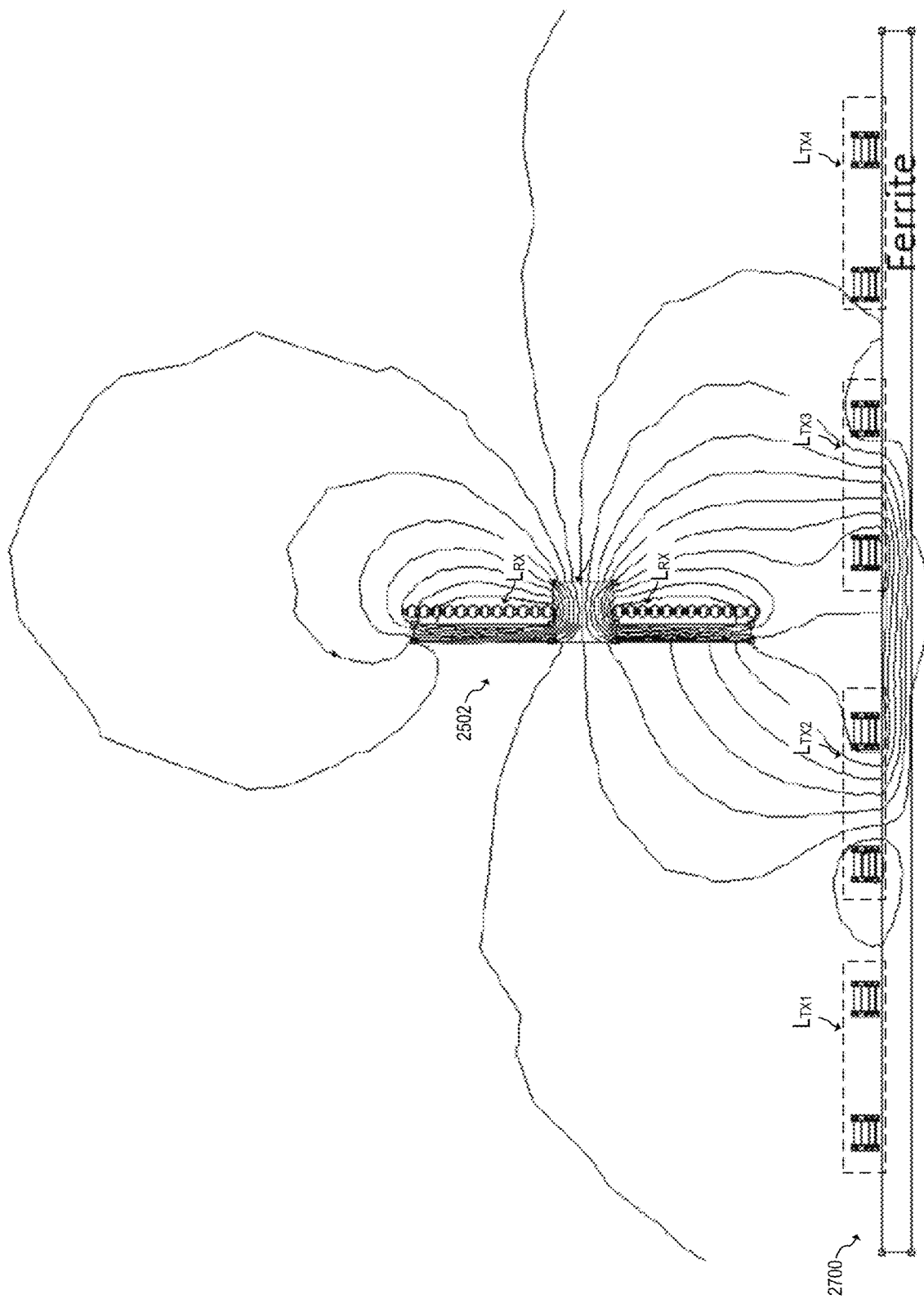
FIG. 30 shows an example of the magnetic flux when wirelessly transmitting power to the smart watch of FIG. 25 when placed inside the charging box FIG. 27 as illustrated in FIG. 29, according to an embodiment of the present invention.

FIG. 30 shows an example of the magnetic flux when wirelessly transmitting power with transmitting coils $L_{TX2}$ and $L_{TX3}$ when smart watch 2500 is placed as illustrated in FIG. 29, according to an embodiment of the present invention. As shown in FIG. 30, the ferrite core of the receiver causes the magnetic flux to flow through the center of the receiving coil $L_{RX}$, e.g., from $L_{TX2}$ to $L_{TX3}$.

Although the embodiment illustrated in FIG. 30 uses $L_{TX2}$ and $L_{TX3}$, other transmitting coil pairs can be used so that the receiving coil $L_{RX}$ is between them. For example, with the placement illustrated in FIGS. 29 and 30, coils $L_{TX1}$, and $L_{TX3}$ can be used, or coils $L_{TX2}$ and $L_{TX4}$, or coils $L_{TX1}$ and $L_{TX4}$.

Figure 31:
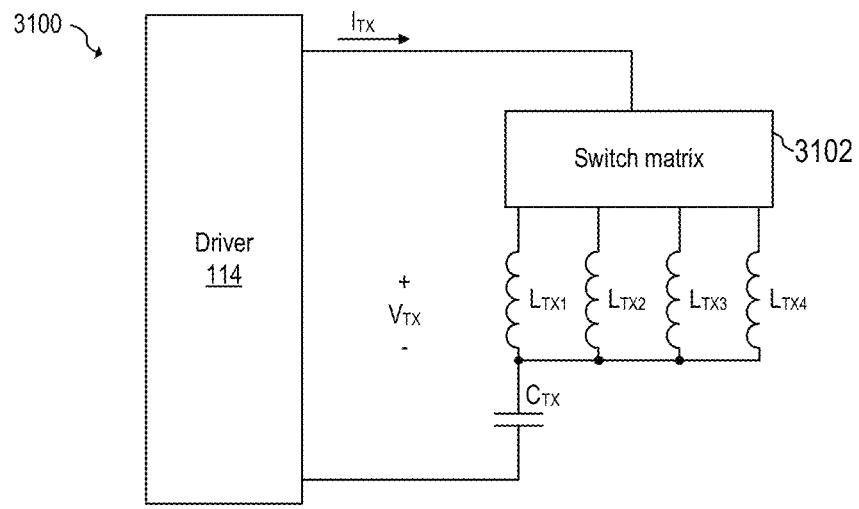
FIG. 31 shows a wireless power transmitter having a switch matrix, according to an embodiment of the present invention.

A switch matrix may be used to connect in series the transmitting coils (e.g., of charging box 2700) to be used, e.g., for wirelessly transmitting power to a device, such as smart watch 2500. For example, FIG. 31 shows wireless power transmitter 3100 having switch matrix 3102, according to an embodiment of the present invention. As shown, switch matrix 3102 is capable of selecting a pair of transmitting coils from transmitting coils $L_{TX1}$, $L_{TX2}$, $L_{TX3}$ and $L_{TX4}$. For example, transmitting coils $L_{TX2}$ and $L_{TX3}$ (e.g., as shown in FIG. 30) may be selected, and a current (or a portion of a current) $I_{TX}$ flows through coils $L_{TX2}$ and $L_{TX3}$ to induce the corresponding magnetic field.

In some embodiments, switch matrix 3102 may be implemented, e.g., in a similar manner a switch matrix 1004 or 1024, e.g., adapted for 4 coils.

In some embodiments, determining which pair of transmitting coils to select may involve sending a (e.g., analog or digital) ping from each possible transmitting coil pair and selecting the transmitting coil pair that transmits the most power (e.g., based on feedback received from the wireless power receiver during the ping process).

As shown in FIG. 30, in some embodiments, most of the magnetic flux flows through the center or the bottom portion of the receiving coil $R_{LX}$. Thus, in some embodiments, the top portion of the receiving coil $L_{RX}$ may be used to place electronic components. For example, FIG. 32 shows an embodiment in which electronic components are disposed in a PCB 3202 that is attached to the top portion of the ferrite core of the wireless power receiver of smart watch 2500, according to an embodiment of the present invention.

Figure 32:
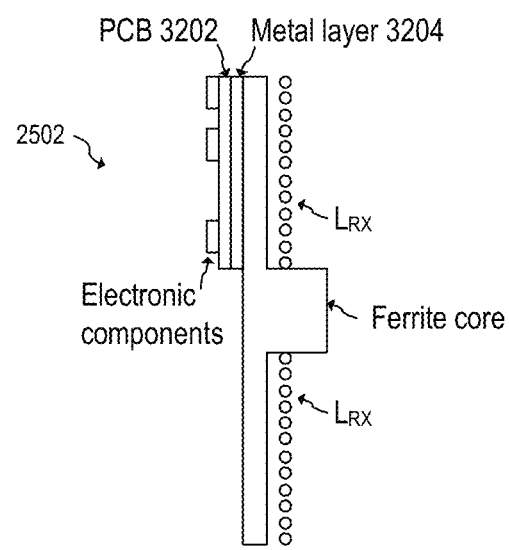
FIG. 32 shows an embodiment in which electronic components are disposed in a PCB that is attached to the top portion of the ferrite core of the wireless power receiver, according to an embodiment of the present invention.

As shown in FIG. 32, some embodiments may include a metallic layer 3204 (which may be, e.g., a ground plane inside the PCB 3202), e.g., for noise prevention. In some embodiments, the presence of the metallic layer 3204 may not cause the foreign object detection (FOD) of the wireless power transmitter to activate since little or no magnetic flux flows where the metallic layer 3204 is located.

Figure 33:
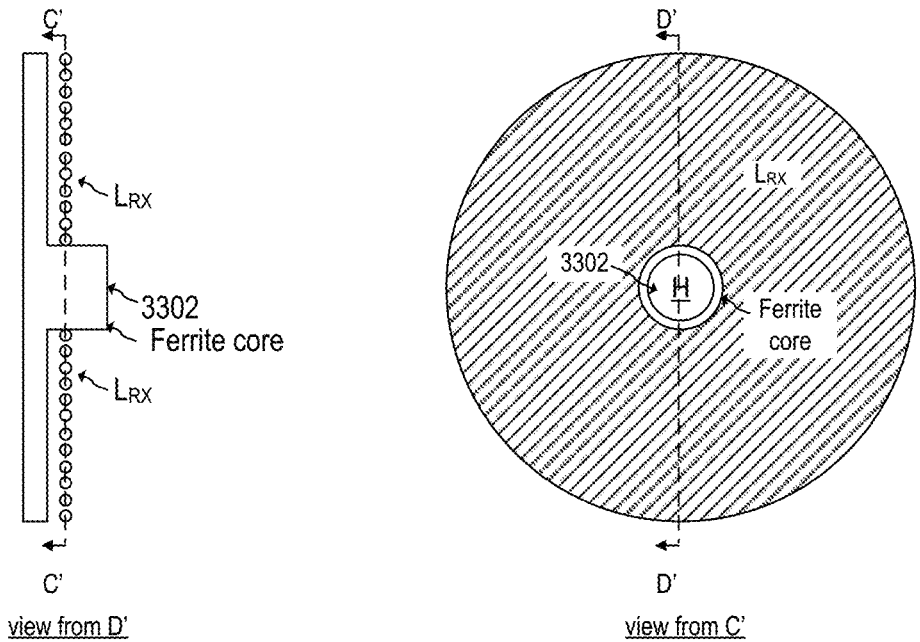
FIG. 33 shows a possible implementation of the ferrite core of FIG. 32, according to an embodiment of the present invention.

In some embodiments, the center of the ferrite core shown in FIG. 32 may be hollow, e.g., such as shown in FIG. 33. In some embodiments, the opening 3302 may be used to place a rechargeable battery or electronic components, for example.

Figure 34:
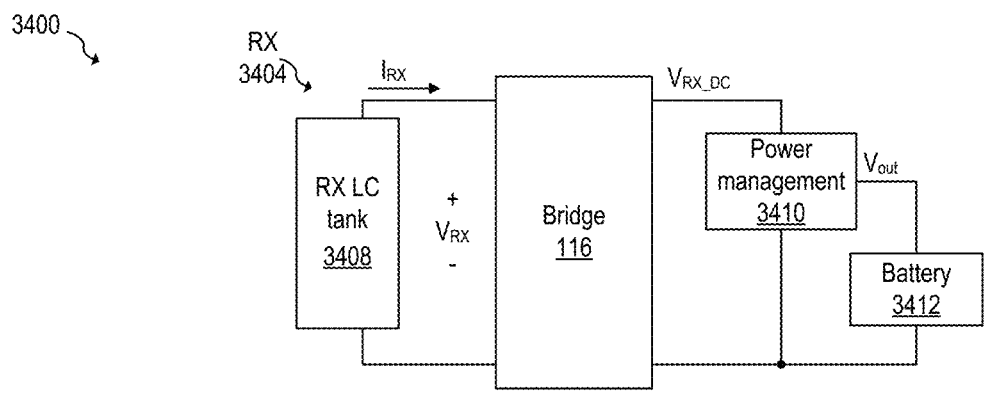
FIG. 34 shows a schematic diagram of a device, according to an embodiment of the present invention.

FIG. 34 shows a schematic diagram of device 3400, according to an embodiment of the present invention. Device 3400 includes wireless power receiver 3404. Wireless power receiver 3404 includes resonant tank 3408, rectifying bridge 116, power management circuit 3410, rechargeable battery 3412, and other circuits (not shown).

During normal operation, wireless power receiver 3404 receives power via resonant tank 3408, and generates rectified voltage $V_{RX\_DC}$ using rectifying bridge 116. Power management circuit 3410 generates a regulator voltage $V_{out}$ that is used to charge rechargeable battery 3412.

In some embodiments, device 3400 may be, e.g., any of active stylus 400, 600, 1100, 1300, or 1400, smart glasses 2000, or smart watch 2500. In some embodiments, device 3400 may be, e.g., a smart mouthguard (smart guard), a smart screw driver, or another mobile device, for example.

In some embodiments, device 3400 may include an enclosure (not shown), such as 402, 1902, 2004, 2100, 2200, or 2502 that includes wireless power receiver 3404. In some embodiments, the enclosure of device 3400 includes a hollow ferrite core (e.g., 1402), and rechargeable battery 3412 and/or some of the electronic components of wireless power receiver 3404 (e.g., 116, 3410) are disposed inside such hollow ferrite core.

In some embodiments, the enclosure of device 3400 includes a metal shield (e.g., 1302) surrounding some of the electronic components of wireless power receiver 3404 (e.g., 116, 3410).

In some embodiments, resonant tank 3408 includes a resonant capacitor $C_{RX}$ and a single receiving coil $L_{RX}$ (e.g., as receiver 404). In some embodiments, resonant tank 3408 includes two receiving coils (e.g., $L_{RX}$, $L_{RX2}$, as receiver 604). In some embodiments, resonant tank 3408 includes three receiving coils (e.g., $L_{RX}$, $L_{RX2}$, $L_{RX3}$, as receiver 1304) or more.

In some embodiments, wireless power receiver 3404 includes a switch matrix (e.g., 1004, 1024, 1204, 1224) for enabling/disabling receiving coil of resonant tank 3408.

In some embodiments, device 3400 is configured to be used with a charging box (e.g., 2700), e.g., for enforces a particular (e.g., optimal) alignment for wireless power transfer to the device 3400 from a wireless power transmitter.

In some embodiments, power management circuit 3410 includes an LDO, a switching regulator (e.g., buck converter), and/or a battery charger.

Example embodiments of the present invention are summarized here. Other embodiments can also be understood from the entirety of the specification and the claims filed herein.

Example 1. An active stylus including: an enclosure; a first ferrite core disposed inside the enclosure; a wireless power receiver that includes a first receiving coil wrapped around the first ferrite core between the first ferrite core and the enclosure; and an alignment mark configured to be aligned with a center of a transmitting coil of a wireless power transmitter, where the alignment mark is not align with a center of the first receiving coil.

Example 2. The active stylus of example 1, where the first ferrite core is cylindrical.

Example 3. The active stylus of one of examples 1 or 2, where the first ferrite core is hollow, the active stylus further including a rechargeable battery inside the first ferrite core.

Example 4. The active stylus of one of examples 1 to 3, where the wireless power receiver further includes a second receiving coil wrapped around a second ferrite core, the second receiving coil disposed between the second ferrite core and the enclosure, and where the first receiving coil and the second receiving coil are coupled in series.

Example 5. The active stylus of one of examples 1 to 4, further including a switch matrix to selectively bypass the first receiving coil or the second receiving coil.

Example 6. The active stylus of one of examples 1 to 5, where the wireless power receiver is configured to operate at a wireless power transmission frequency between 80 kHz and 600 kHz.

Example 7. The active stylus of one of examples 1 to 6, where the wireless power receiver is configured to operate at a wireless power transmission frequency of about 100 kHz.

Example 8. The active stylus of one of examples 1 to 7, where the wireless power receiver is configured to receive power from a Qi compatible wireless power transmitter.

Example 9. The active stylus of one of examples 1 to 8, where the wireless power receiver is configured to receive power from a wireless power transmitter when the first receiving coil is disposed on top of a winding of a transmitting coil of the wireless power transmitter.

Example 10. The active stylus of one of examples 1 to 9, where the active stylus includes an axis of rotation, and where the first receiving coil is disposed in a symmetric manner with respect to the axis of rotation.

Example 11. The active stylus of one of examples 1 to 10, where the first ferrite core is configured to cause a flow of magnetic flux generated by a wireless power transmitter in a direction parallel to the axis of rotation.

Example 12. The active stylus of one of examples 1 to 11, further including a shield disposed between a circuit of the active stylus and the enclosure.

Example 13. The active stylus of one of examples 1 to 12, where the shield is implemented with metallic tape.

Example 14. A method for wirelessly transmitting power to a mobile device, the method including: inducing a transmitter current to flow through first and second transmitting coils of a wireless power transmitter, where the first and second transmitting coils are coupled in series; causing a magnetic flux to flow from the first transmitting coil to the second transmitting coil; and inducing a receiver current to flow in the a receiving coil by directing the magnetic flow through a center of the receiving coil using a ferrite core.

Example 15. The method of example 14, where the mobile device is an active stylus.

Example 16. The method of one of examples 14 or 15, where the mobile device is a smart glasses.

Example 17. The method of one of examples 14 to 16, where the mobile device is a smart watch.

Example 18. The method of one of examples 14 to 17, where the wireless power transmitter includes a third and fourth transmitting coils, the method further including selecting a pair transmitting coil from the first, second, third and fourth transmitting coils, and coupling the selected pair in series before inducing the transmitter current.

Example 19. The method of one of examples 14 to 18, where inducting the transmitter current includes inducting the transmitter current with a frequency of about 6.78 MHz.

Example 20. The method of one of examples 14 to 19, where inducting the transmitter current includes inducting the transmitter current with a frequency of about 13.56 MHz.

Example 21. A smart watch system including: a smart watch including a receiving coil, the receiving coil wrapped around a first axis; and a charging box including: a bottom surface parallel to the first axis, and a plurality of transmitting coils, where each of the plurality of transmitting coils are wrapped around a second axis that is orthogonal to the first axis, where the charging box is configured to wirelessly transmit power to the smart watch via the receiving coil by using two transmitting coils of the plurality of transmitting coils.

Example 22. The smart watch system of example 21, where the plurality of transmitting coils are disposed inside the charging box.

Example 23. The smart watch system of one of examples 21 or 22, where the plurality of transmitting coils are disposed outside the charging box and attached to the bottom surface of the charging box.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A smart watch system comprising:
a smart watch comprising a receiving coil, the receiving coil wrapped around a first axis; and
a charging box comprising:
a bottom surface parallel to the first axis; and
a plurality of transmitting coils, wherein each of the plurality of transmitting coils are wrapped around a second axis that is orthogonal to the first axis,
wherein the charging box is configured to wirelessly transmit power to the smart watch via selected transmitting coils of the plurality of transmitting coils,
wherein the plurality of transmitting coils is disposed outside the charging box at the bottom surface of the charging box, and
wherein each of the transmitting coils is implemented with a single turn per layer, and with multiple layers.

2. The smart watch system of claim 1, wherein the plurality of transmitting coils are disposed inside the charging box.

3. The smart watch system of claim 1, wherein the selected transmitting coils are more than two.

4. The smart watch system of claim 1, wherein the charging box further comprises a switch matrix configured to:
determine a pair of transmitting coils as the selected transmitting coils based on a placement of the smart watch on the charging box; and
connect the pair of transmitting coils in series.

5. The smart watch system of claim 4, wherein the charging box is configured to determine the pair of transmitting coils by sending an analog ping from each possible transmitting coil pair and selecting the pair of transmitting coils that transmits the most power.

6. The smart watch system of claim 5, wherein the charging box is configured to select the pair of transmitting coils based on feedback received from a wireless power receiver of the smart watch during a ping process.

7. The smart watch system of claim 4, wherein the charging box is configured to determine the pair of transmitting coils by sending a digital ping from each possible transmitting coil pair and selecting the pair of transmitting coils that transmits the most power.

8. The smart watch system of claim 7, wherein the charging box is configured to select the pair of transmitting coils based on feedback received from a wireless power receiver of the smart watch during a ping process.

9. The smart watch system of claim 1, wherein the smart watch further comprises a ferrite core, a metal layer, a PCB and electronic components, wherein the electronic components are arranged on one side of the PCB and the metal layer on another side of the PCB, wherein the ferrite core is arranged on a side of the metal layer facing away from the PCB, and wherein the receiving coil is arranged at the ferrite core.

* * * * *